US009990332B2

(12) United States Patent
Takahashi et al.

(10) Patent No.: US 9,990,332 B2
(45) Date of Patent: Jun. 5, 2018

(54) VEHICLE MOTION CONTROL DEVICE

(75) Inventors: Junya Takahashi, Saitama (JP); Makoto Yamakado, Tsuchiura (JP); Shinjiro Saito, Kasumigaura (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days. days.

(21) Appl. No.: 13/813,055

(22) PCT Filed: Jul. 19, 2011

(86) PCT No.: PCT/JP2011/066298
§ 371 (c)(1),
(2), (4) Date: Jan. 29, 2013

(87) PCT Pub. No.: WO2012/014707
PCT Pub. Date: Feb. 2, 2012

(65) Prior Publication Data
US 2013/0131947 A1 May 23, 2013

(30) Foreign Application Priority Data

Jul. 30, 2010 (JP) .................................. 2010-171304

(51) Int. Cl.
*G06F 17/00* (2006.01)
*B60T 7/04* (2006.01)
(Continued)

(52) U.S. Cl.
CPC ............. *G06F 17/00* (2013.01); *B60T 7/042* (2013.01); *B60T 7/12* (2013.01); *B60T 7/18* (2013.01);
(Continued)

(58) Field of Classification Search
USPC .......... 701/1, 23, 36, 58, 70, 72, 93, 94, 96, 701/532; 340/441
See application file for complete search history.

(56) References Cited

U.S. PATENT DOCUMENTS 5,521,822 A * 5/1996 Wang .................. B60R 21/0132
180/282
5,832,188 A * 11/1998 Papiernik ............. G05B 19/416
700/245
(Continued)

FOREIGN PATENT DOCUMENTS

JP 2008-12975 A 1/2008
JP 2008-285066 A 11/2008
(Continued)

OTHER PUBLICATIONS

Yamakado et al., "Proposal of the Longitudinal Driver Model in Coordination with Vehicle Lateral Motion based upon Jerk Information—A Driver Model Derived from Voluntary Driving that has Vehicle Dynamic Rationalty-", International Journal of Automotive Engineering (IJAE), vol. 39, No. 3, May 2008 (twenty one (21) pages including English translation).

(Continued)

*Primary Examiner* — Rami Khatib
(74) *Attorney, Agent, or Firm* — Crowell & Moring LLP

(57) ABSTRACT

A vehicle motion control device includes curve shape acquisition means for acquiring a shape of a curve present in front of a currently traveling vehicle, vehicle position acquisition means for acquiring a position of the vehicle, and vehicle motion control arithmetic means for computing, on the basis of the shape of the curve and the position of the vehicle, a command value relating to longitudinal acceleration to be caused to the vehicle. During a time interval from before the vehicle reaches a near end of the curve, until the vehicle has approached the curve and traveled to a site having a constant or maximum curvature of the curve, the vehicle motion control arithmetic means computes a plurality of different negative longitudinal acceleration command values. Thus, even when there is no lateral motion, the vehicle motion (Continued)

control device accelerates/decelerates the vehicle while improving a driver's feeling of slowdown.

15 Claims, 15 Drawing Sheets

(51) Int. Cl.
   *B60T 7/12* (2006.01)
   *B60W 30/02* (2012.01)
   *B60W 30/18* (2012.01)
   *B60T 7/18* (2006.01)
   *B60W 50/00* (2006.01)

(52) U.S. Cl.
   CPC .... *B60W 30/025* (2013.01); *B60W 30/18145* (2013.01); *B60T 2201/16* (2013.01); *B60T 2210/24* (2013.01); *B60T 2210/36* (2013.01); *B60W 50/0097* (2013.01); *B60W 2550/146* (2013.01); *B60W 2550/402* (2013.01); *B60W 2720/106* (2013.01)

(56) References Cited

U.S. PATENT DOCUMENTS

| | | | | |
|---|---|---|---|---|
| 5,899,948 | A * | 5/1999 | Raphael | B60R 21/01336 180/282 |
| 6,188,316 | B1 * | 2/2001 | Matsuno | B60Q 9/00 340/425.5 |
| 6,778,896 | B1 * | 8/2004 | Matsuura | B60K 31/0066 701/70 |
| 8,364,394 | B2 * | 1/2013 | Taguchi | B60W 10/06 701/117 |
| 8,370,028 | B2 * | 2/2013 | Yamada | B60Q 1/085 340/988 |
| 8,521,362 | B2 * | 8/2013 | Miyajima | B60G 17/0162 180/282 |
| 8,521,416 | B2 * | 8/2013 | Nakada | B62D 15/025 340/435 |
| 2008/0059036 | A1 | 3/2008 | Imai et al. | |
| 2009/0030574 | A1 * | 1/2009 | Yamakado | B60W 30/045 701/44 |
| 2009/0198426 | A1 * | 8/2009 | Yasui | B60W 10/02 701/70 |
| 2009/0216415 | A1 * | 8/2009 | Iwatsuki | B60W 30/188 701/70 |
| 2009/0326761 | A1 * | 12/2009 | Nitta | B60T 8/1755 701/41 |
| 2010/0023232 | A1 * | 1/2010 | Isaji | B60W 30/146 701/70 |
| 2010/0100293 | A1 * | 4/2010 | Takanami | F16H 61/0213 701/65 |
| 2010/0106374 | A1 | 4/2010 | Miyajima et al. | |
| 2012/0035771 | A1 * | 2/2012 | Maekawa | B66B 1/30 700/275 |

FOREIGN PATENT DOCUMENTS

| | | |
|---|---|---|
| JP | 2009-51487 A | 3/2009 |
| JP | 2010-30544 A | 2/2010 |
| JP | 2010-105453 A | 5/2010 |

OTHER PUBLICATIONS

International Search Report dated Oct. 25, 2011 (four (4) page).

* cited by examiner

US 9,990,332 B2

VEHICLE MOTION CONTROL DEVICE

TECHNICAL FIELD

The present invention relates to a vehicle motion control device for accelerating/decelerating a vehicle to make the vehicle suitably move.

BACKGROUND ART

Traditionally, there are known vehicle motion control systems that use the curve information within a car navigation system or a turning lateral acceleration of a vehicle equipped with the motion control system, to slow down the vehicle so that an actual lateral acceleration applied thereto is likely to exceed a previously set value (for example, Patent Document 1).

In such a control device (system), in order that a magnitude of the lateral acceleration occurring when the vehicle moves past the curve will not exceed the previously set value, a target speed of the vehicle during the passage through the curve is set from a curvature of the curve present ahead, as well as from the previously set value of the lateral acceleration, and a necessary negative acceleration is created from the target vehicle speed and an actual speed of the vehicle. This method of creating the negative acceleration is effective for suppressing divergence from the road if the vehicle needs to approach a curve in excess of a maximum speed at which the vehicle can negotiate the curve.

However, if the particular setting of the lateral acceleration is a driver-set lateral acceleration that the system is estimated to permit for a usual turn, not a critical lateral acceleration, and the driver executes deceleration control in front of the curve, then the deceleration will not necessarily match the driver's feeling of slowdown. One reason for this mismatch is that although the foregoing negative-acceleration creating method based on the target vehicle speed is effective for defining a total amount of deceleration (an integral value of the negative acceleration) occurring before the approach to the curve, that method does not allow time-varying changes in the negative acceleration to be defined.

If deceleration control is conducted for constant negative acceleration in front of the curve, the deceleration obtained is likely to mismatch the driver's feeling of slowdown, depending on characteristics of the curve or on the vehicle speed. In addition, if setting the time-varying changes in the negative acceleration is attempted, this requires an unfathomable matching workload and vast volumes of data.

For example, Patent Document 2 and Non-Patent Document 1 propose, as methods of defining time-varying changes in the (positive) acceleration/negative acceleration that matches a driver's feeling of slowdown, methods of creating the (positive) acceleration/negative acceleration based on lateral jerk due to the driver's operations. These methods allow the driver to accelerate/decelerate the vehicle in substantially the same manner as a skilled driver, without setting the time-varying changes in negative acceleration on a curve-by-curve basis.

PRIOR ART LITERATURE

Patent Documents

Patent Document 1: JP-2009-51487-A
Patent Document 2: JP-2008-285066-A

Non-Patent Documents

Non-Patent Document 1:
International Journal of Automotive Engineering (IJAE), Vol. 39, No. 3, 2008

SUMMARY OF THE INVENTION

Problems to be Solved by the Invention

The method of creating the (positive) acceleration/negative acceleration based on lateral jerk, however, is a method that assumes a fact that lateral motion has occurred or is occurring in the vehicle, the method being intended to create the (positive) acceleration/negative acceleration in coordination with the lateral motion. The method does not allow the creation of the negative acceleration under a state of no lateral motion being caused to the vehicle, such as before the vehicle approaches a curve or when the vehicle is decelerating on a straight road.

The present invention has been made with the above circumferences in mind, and an object of the invention is to provide a vehicle motion control device designed so that even under a state of no lateral motion being caused to a vehicle, the device accelerates/decelerates the vehicle while improving a driver's feeling of slowdown.

Means for Solving the Problems

In order to achieve the above object, a vehicle motion control device according to an aspect of the present invention includes curve shape acquisition means for acquiring a shape of a curve present in front of a currently traveling vehicle, vehicle position acquisition means for acquiring a position of the vehicle, and vehicle motion control arithmetic means for computing, on the basis of the shape of the curve and the position of the vehicle, a command value relating to longitudinal acceleration to be caused to the vehicle. If the longitudinal acceleration command value assumes that a direction in which the vehicle is traveling is plus, the vehicle motion control arithmetic means computes a plurality of different negative longitudinal acceleration command values during a time interval from before the vehicle reaches a near end of the curve, until the vehicle has approached the curve and traveled to a site having a constant or maximum curvature of the curve.

A vehicle motion control device according to another aspect of the present invention includes curve shape acquisition means for acquiring a shape of a curve present in front of a currently traveling vehicle, vehicle position acquisition means for acquiring a position of the vehicle, and vehicle motion control arithmetic means for computing, on the basis of the shape of the curve and the position of the vehicle, a command value relating to longitudinal acceleration to be caused to the vehicle. If the longitudinal acceleration command value assumes that a direction in which the vehicle is traveling is plus, the vehicle motion control arithmetic means computes a negative longitudinal acceleration command value during a time interval from before the vehicle reaches a near end of the curve, until the vehicle has approached the curve and traveled to a site having a constant or maximum curvature of the curve, and the negative longitudinal acceleration command value acts so that except immediately after a start of slowdown, longitudinal jerk that is a change in longitudinal acceleration with time is increased/decreased during the period from before the vehicle reaches the near end of the curve, until the curve has reached the constant or maximum curvature.

The present specification includes the contents of the specification and/or drawings accompanying the Japanese Patent Application, No. 2010-171304, from which the present application claims priority.

Effects of the Invention

The present invention provides a vehicle motion control device designed so that even under a state of no lateral motion being caused to a vehicle, the device accelerates/decelerates the vehicle with a good driver's feeling.

MODE FOR CARRYING OUT THE INVENTION

Figure 1:
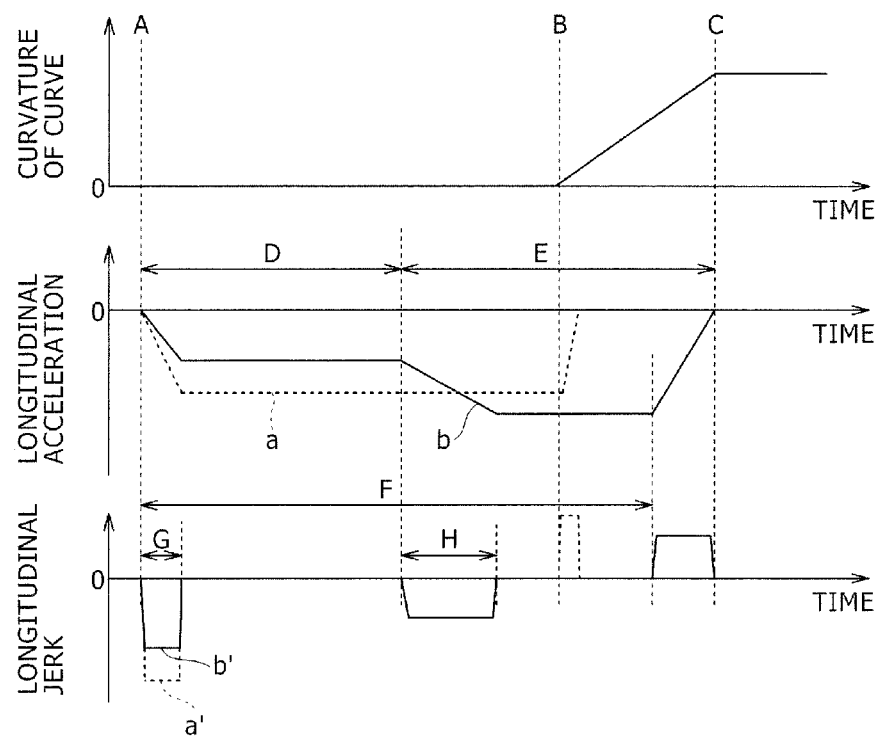
FIG. 1 is a conceptual diagram that represents how a vehicle motion control device according to the present invention changes a longitudinal acceleration in front of a curve.

A conceptual diagram is shown in FIG. 1 that represents how longitudinal acceleration in front of a curve changes in the present invention.

Referring to FIG. 1, longitudinal acceleration and longitudinal jerk in a conventional technique are denoted as "a" and "a'", respectively, and longitudinal acceleration and longitudinal jerk in the present invention, as "b" and "b'", respectively.

As shown in FIG. 1, deceleration of a vehicle in the conventional technique is constant during a period from time A at which the vehicle reaches a site present in front of a curve, to time B at which the vehicle starts to approach the curve. Under the conditions that makes the vehicle speed high, therefore, strong negative acceleration is likely to occur before a driver of the vehicle definitely recognizes a curvature of the curve, and as a result, even if predetermined lateral acceleration is occurring during a turn, the driver will feel as if the vehicle had slowed down too much in front of the curve.

In the present invention, longitudinal acceleration continues to change during a period from the time A to time C at which the curvature of a curve becomes constant, and during this change in longitudinal acceleration, the vehicle changes from a deceleration pattern based upon the curvature of the curve in zone D that is where the curve lies far ahead, to a deceleration pattern depending upon time-varying changes in the curvature of the curve in zone E that is where the vehicle position is near the curve. Consequently, the present invention is characterized in that in zone F from a starting point of deceleration to a section at which negative acceleration becomes a maximum, increases and decreases in longitudinal jerk occur in zone G that is where the vehicle exists immediately after it has started to decelerate, and in zone H that is where the vehicle changes to the deceleration pattern near the curve.

This feature allows the vehicle to change from a deceleration pattern based upon a fact that way before the curve, a driver has recognized a "necessity to slow down because of the curve lying ahead", to the deceleration pattern in which, near the curve, the driver recognizes a "necessity to slow down a little more because of the curve being greater in the curvature" in response to the changes in the curvature of the curve and the deceleration varies with the time-varying changes in the curvature of the curve. Briefly, the slowdown matching the driver's feeling can be realized.

(Method of Computing a Longitudinal Acceleration Command Value Based Upon the Curvature of the Curve and a Change in the Curvature of the Curve)

Figure 2:
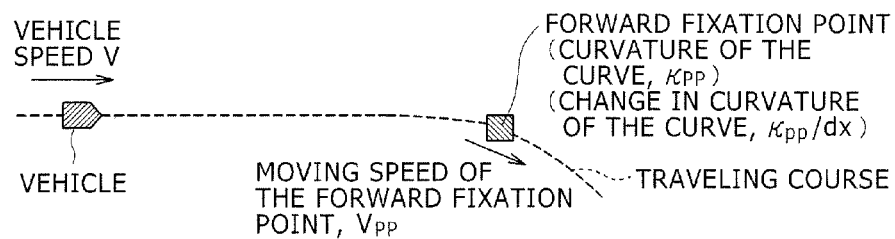
FIG. 2 is a conceptual diagram that represents a relationship in position between a vehicle equipped with the vehicle motion control device according to the present invention, and a driver's forward fixation point.

Prior to description of embodiments, for a better understanding of the present invention, a method of computing a longitudinal acceleration command value based upon the curvature of the curve and a change in the curvature of the curve is described below using FIG. 2. In the present specification, longitudinal acceleration is plus at its acceleration side and minus at its deceleration side, and negative acceleration takes a plus value at its deceleration side. Consider a scene in which, as shown in FIG. 2, the vehicle travels at a vehicle speed V along a traveling course denoted as a dashed line. At this time, the driver is estimated to look at a shape of the traveling course ahead and accelerate/decelerate the vehicle. A position that represents in simulated form a point which the driver is viewing at this time is set as a forward fixation point in a traveling direction of the vehicle, and a curvature of a curve at this position is expressed as $K_{PP}$, and a change in the curvature of the curve, as $dK_{PP}/dx$. The forward fixation point here is a point lying on the forward course of the vehicle, at a distance $L_{pp}$ from the vehicle, $L_{pp}$ being a value obtained by integrating a time $T_{pp}$ set for the vehicle speed V in advance. The curvature $K_{PP}$ of the curve has a value of at least 0 independently of a direction of the curve, and if the curve has a sufficiently large radius of curvature, the curvature $K_{PP}$ is taken as 0. If the vehicle is considered to approach a position of the forward fixation point while maintaining the vehicle speed V, the lateral acceleration $G_{yEST}$ and lateral jerk $dG_{yEST}$, a change in the lateral acceleration with time, that are estimated to occur during the approach will take values given by expressions (1) and (2), respectively. The lateral acceleration $G_{yEST}$ here, as can be seen from expression (1), will always take a value of at least 0, irrespective of whether the vehicle turns to the left or to the right.

[Expression 1]

$$G_{yEST} = \kappa_{PP} \cdot V^2 \quad (1)$$

[Expression 2]

$$dG_{yEST} = \frac{d\kappa_{PP}}{dt} \cdot V^2 + \kappa_{PP} \cdot 2V \cdot \frac{dV}{dt} \quad (2)$$

Under conditions that the position of the vehicle is near the curve and the distance from the vehicle to the forward fixation point is short, if the driver accelerates/decelerates with substantially the same algorithm as the foregoing methods of creating the (positive) acceleration/negative acceleration based on lateral jerk (Patent Document 2 and Non-Patent Document 1), the longitudinal acceleration command value $G_{xREQ}$ based upon the estimated lateral jerk value $dG_{yEST}$ will be given by expression (3).

[Expression 3]

$$G_{xREQ} = -C_{xy} \cdot dG_{yEST} \quad (3)$$

where $C_{xy}$ is a proportionality constant, which is a value that is set in advance. Supposing that an influence of a second term $$\left(\kappa_{PP} \cdot 2V \cdot \frac{dV}{dt}\right)$$

in expression (2) is sufficiently insignificant relative to that of a first term $$\left(\frac{d\kappa_{PP}}{dt} \cdot V^2\right)$$

and assigning expression (2) to expression (3) allows one to obtain expression (4).

[Expression 4]

$$G_{xREQ-} - C_{xy} \cdot \frac{d\kappa_{PP}}{dt} \cdot V^2 \quad (4)$$

The longitudinal acceleration command value based upon the time-varying change in the curvature of the curve, $dK_{PP}/dt$, at the forward fixation point, is thus obtained. Additionally, $dK_{PP}/dt$ can be rewritten as represented by expression (5).

[Expression 5]

$$\frac{d\kappa_{PP}}{dt} = \frac{d\kappa_{PP}}{dx} \cdot \frac{dx}{dt} \quad (5)$$

where (dx/dt) is a moving speed $V_{PP}$ of the forward fixation point, such that expression (4) is given by expression (6) using $V_{PP}$.

[Expression 6]

$$G_{xREQ-} - C_{xy} \cdot \frac{d\kappa_{PP}}{dx} \cdot V_{PP} \cdot V^2 \quad (6)$$

This allows creation of the longitudinal acceleration command value in vicinity of the curve.

Figure 3:
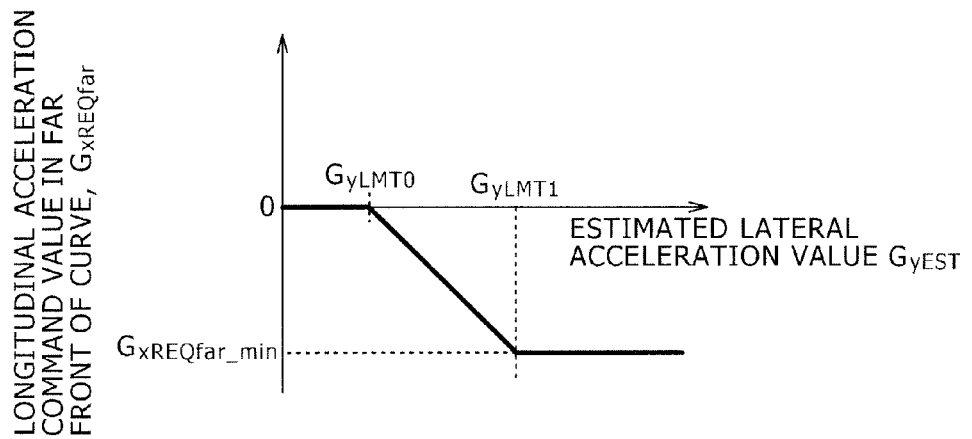
FIG. 3 is a diagram that represents a relationship between an estimated lateral acceleration value in the vehicle motion control device according to the present invention, and a longitudinal acceleration command value created at a long distance to the curve.

Conversely, under conditions that the curve is way ahead of the vehicle position and the distance from the vehicle to the forward fixation point is long, the driver is estimated to be decelerating according to an ambiguous curvature of the curve since the driver is probably unable to obtain detailed information such as the change in the curvature of the curve. The longitudinal acceleration command value $G_{xREQfar}$ at this time may be created using, for example, the estimated lateral acceleration value $G_{yEST}$ obtained from above expression (1). More specifically, as shown in FIG. 3, the longitudinal acceleration command value $G_{xREQfar}$ may, according to the estimated lateral acceleration value $G_{yEST}$, be decreased (or increased in terms of negative acceleration) from a set lateral acceleration value $G_{yLMT0}$ to another set lateral acceleration value $G_{yLMT1}$ until the longitudinal acceleration command value $G_{xREQfar}$ has been minimized to $G_{yREQfar\_min}$ for $G_{yLMT1}$. Alternatively, the longitudinal acceleration command value $G_{xREQfar}$ may be given by expression (7) using $L_{far}$ as the distance from the vehicle to the forward fixation point far ahead and $G_{ySET}$ as yet another set lateral acceleration value. Referring to expression (7), "min (A, B)" is a function that specifies A or B, whichever is the smaller, and "max (A, B)" is a function that specifies A or B, whichever is the larger.

[Expression 7]

$$G_{xREQfar} = \max\left(\min\left(C_x \cdot \frac{(G_{ySET}/K_{PP}) - V^2}{2 \cdot L_{far}} \cdot 0\right) \cdot G_{xREQfar\_min}\right) \quad (7)$$

where $L_{far}$, if it is a value larger than 0, can be a previously set value or a value obtained by integrating the time $T_{pp}$ set for the vehicle speed V in advance. In addition, even when $G_{ySET}$ and $G_{xREQfar\_min}$ are previously set values, provided that the vehicle motion control device includes means for acquiring road surface friction coefficients and/or means for enabling data setting by the driver, $G_{ySET}$ and $G_{xREQfar\_min}$ can be the values that change according to a road surface friction coefficient or the value set by the driver.

Furthermore, $C_x$ can be either a value that is set in advance, or a value that changes in response to, for example, accelerator pedal operations by the driver. Although the method of creating $G_{xREQfar}$ is not limited to or by that of these values, the negative acceleration based on $G_{xREQfar}$ is created so as to be equal to or less than the negative acceleration dictated by the longitudinal acceleration $G_{xREQ}$ in the vicinity of the curve.

The longitudinal acceleration command values in the vicinity of the curve and at a long distance to the curve are thus obtained. Creating a final longitudinal acceleration command value from the obtained command values allows generation of the longitudinal acceleration that increases, as with "b" of FIG. 1, from the deceleration pattern based on the curvature of the curve way ahead (i.e., in zone D), to the deceleration pattern depending on the change in the curvature of the curve with time in the vicinity of the curve (i.e., in zone E).

Figure 4:
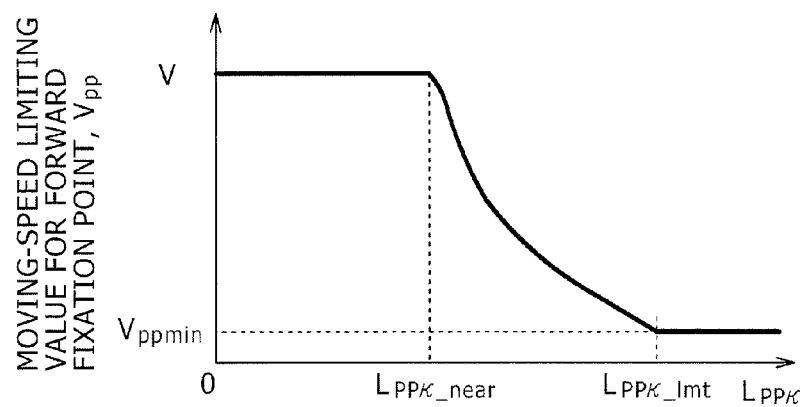
FIG. 4 is a diagram that represents a relationship between a distance to the forward fixation point and a moving speed of the forward fixation point, in the vehicle motion control device according to the present invention.

In the above, an independent longitudinal acceleration command has been created in each of the case that the vehicle position is in the vicinity of the curve, and the case that the vehicle position is a long distance off to the curve. Instead, the moving speed $V_{PP}$ of the forward fixation point in expression (6) may be varied in terms of the distance to the curve so as to cause a change from the deceleration pattern in the case that the vehicle position is a long distance off to the curve, to the deceleration pattern in the case that vehicle position is in the vicinity of the curve. For example, if the curvature $K_{PP}$ of the curve at the forward fixation point becomes equal to or more than a certain value $K_{PPlmt}$, then as a forward fixation distance $L_{ppk}$ decreases, the moving speed $V_{PP}$ of the forward fixation point may be increased so that: as shown in FIG. 4, in a region that the forward fixation distance $L_{ppk}$ is greater than $L_{ppk\_lmt}$, the moving speed $V_{PP}$ of the forward fixation point equals $V_{PPmin}$ and the vehicle approaches the curve and reaches the vehicle speed V at a forward fixation distance $L_{ppk\_near}$.

In this case, $L_{ppk\_lmt}$ and $L_{ppk\_near}$ are values that are set in advance to ensure that $L_{ppk\_lmt}$ exceeds $L_{ppk\_near}$, and $V_{PPmin}$ is a value that is set in advance to exceed 0 but not exceed the vehicle speed V.

Under a state that the vehicle position is at a long distance to the curve and the driver has an ambiguous recognition of the curve, the driver's line of sight moves slowly, and as the vehicle approaches the curve and the driver moves the line of sight along the curve, the moving speed of the line of sight tends to increase. FIG. 4 is a graphical representation of this behavior in a form of the moving speed of the forward fixation point.

Figure 5:
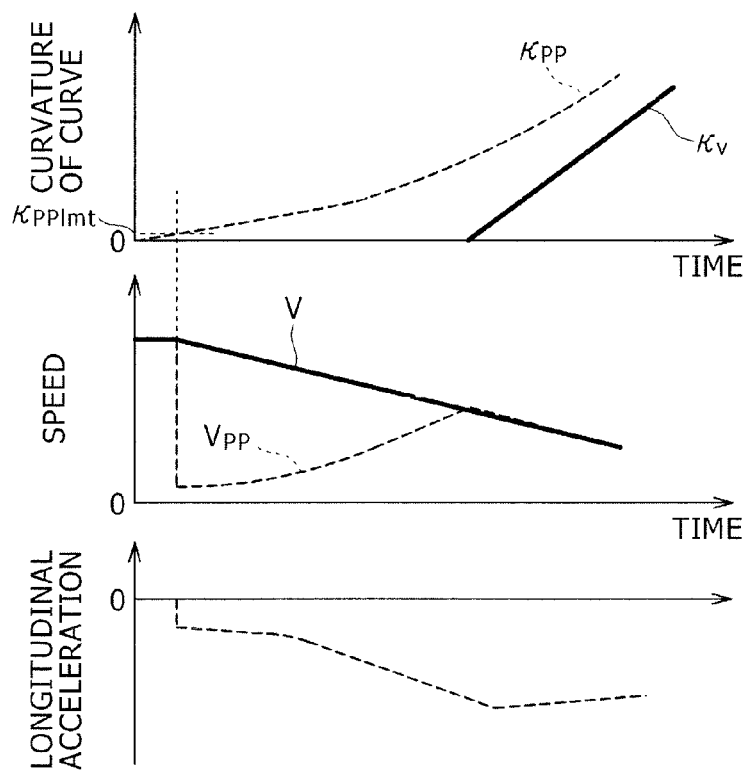
FIG. 5 is a diagram that represents time-varying changes in the curvature of the curve, speed, and longitudinal acceleration, in the present invention.

Thus, when the vehicle travels along the course having a curve of a curvature $K_v$ at the vehicle position, the curvature $K_{PP}$ of the curve at the forward fixation point and the moving speed $V_{PP}$ of the forward fixation point change as shown in FIG. 5. As a result, as the vehicle approaches the curve, negative acceleration gradually increases from the small negative acceleration at the great distance in front of the curve.

First Embodiment for Carrying Out the Invention

Hereunder, a configuration and operation of a vehicle motion control device according to a first embodiment of the present invention will be described using FIGS. 6 to 10.

First, the configuration of the vehicle motion control device according to the first embodiment of the present invention is described below using FIG. 6.

Figure 6:
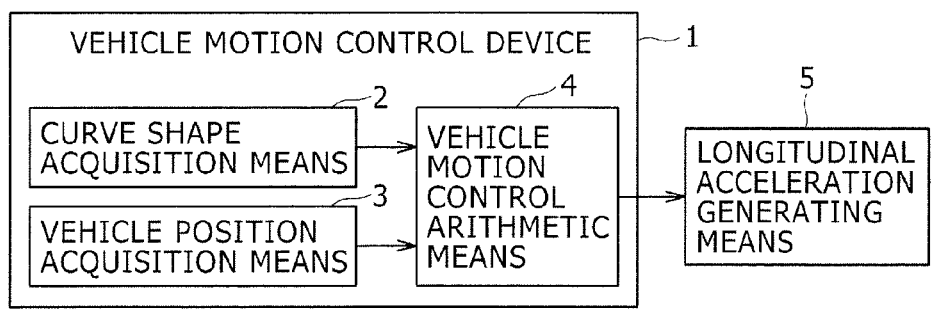
FIG. 6 is a diagram that shows a first embodiment of a vehicle motion control device according to the present invention.

FIG. 6 is a system block diagram showing the configuration of the vehicle motion control device according to the first embodiment of the present invention.

The vehicle motion control device 1 of the present embodiment, intended to be mounted on a vehicle, includes curve shape acquisition means 2 for acquiring a shape of a curve present in front of the vehicle, vehicle position acquisition means 3 for acquiring a position of the vehicle, and vehicle motion control arithmetic means 4 for computing, in accordance with the information that has been obtained by the curve shape acquisition means 2 and the vehicle position acquisition means 3, a longitudinal acceleration to be caused to the vehicle. Computation results by the vehicle motion control arithmetic means 4 are sent to longitudinal acceleration generating means 5 and used to drive an actuator having an ability to cause the longitudinal acceleration to the vehicle.

The curve shape acquisition means 2 can be or may use any of the following methods: acquiring the shape of the curve from map information relating to a course which the vehicle travels; acquiring curve information on the traveling direction of the vehicle, by means of road-to-vehicle communication; acquiring curve information from a vehicle traveling in front in the traveling direction of the vehicle equipped with the control device, by means of vehicle-to-vehicle communication; acquiring the shape of the curve lying ahead of the vehicle, from imaging means; and acquiring curve shape information by communicating with either map information acquisition means, road-to-vehicle communication means, vehicle-to-vehicle communication means, or the imaging means.

The vehicle position acquisition means 3 can be, or may use, any of the following methods: acquiring a position of the vehicle relative to the curve in front of the vehicle, from coordinates of the vehicle by means of a global positioning system (GPS); acquiring the position of the vehicle relative to the curve in front of the vehicle, by means of road-to-vehicle communication; acquiring the position of the vehicle relative to the curve in front of the vehicle, by acquiring an image of a scene or object present in front of or around the vehicle, or both thereof, from imaging means; and acquiring the position of the vehicle relative to the curve, by communicating with either the GPS, road-to-vehicle communication means, or the imaging means.

Referring to the above, the control device may include a plurality of methods as the curve shape acquisition means 2 and the vehicle position acquisition means 3. For example, means for acquiring curve shape information from the map information and the imaging means, may be provided as the curve shape acquisition means 2, and means for acquiring the vehicle position from the GPS and the imaging means, may be provided as the vehicle position acquisition means 3. Combination of the plurality of methods allows more accurate curve shape information and vehicle position information to be obtained from, for example, information on surroundings of the curve lying far ahead, and information on the vehicle position. More specifically, the information acquisition may take place by, when the curve is far ahead, using the map information, the GPS-based curve shape information, and the vehicle position information, and when the curve is nearby, using the curve shape information and vehicle position information obtained from the imaging means, in addition to the map information, GPS-based curve shape information, and vehicle position information described above.

If the acquisition of the GPS-based vehicle position information is difficult, the curve shape information and vehicle position information required for longitudinal acceleration control can be acquired by acquiring the curve shape information and the vehicle position information from the imaging means. Conversely if the curve shape information and the vehicle position information are difficult to acquire with the imaging means, the curve shape information and vehicle position information required for longitudinal acceleration control can be acquired by acquiring the curve shape information and the vehicle position information from the GPS and the map information.

The longitudinal acceleration generating means 5 is an acceleration/deceleration actuator constructed to generate longitudinal acceleration, the actuator being, for example, either an engine that generates longitudinal acceleration by controlling a throttle angle of the engine, a motor that generates longitudinal acceleration by controlling a driving torque of a motor, a transmission that generates longitudinal acceleration by changing a gear ratio during transmission of motive power to wheels, or a friction brake mechanism that generates longitudinal acceleration by pressing brake discs against brake pads of each wheel.

The vehicle motion control arithmetic means 4 is an arithmetic unit with a storage region, arithmetic processing capabilities, and signal input/output means. The arithmetic means 4 computes, from the curve shape and vehicle position obtained by the curve shape acquisition means 2 and the vehicle position acquisition means 3, respectively, a command value relating to the longitudinal acceleration to be caused to the vehicle, activates the acceleration/deceleration actuator, constructed for generating the longitudinal acceleration that becomes the longitudinal acceleration command value, to work as the longitudinal acceleration generating means 5, and sends the longitudinal acceleration command value to a driving controller of the acceleration/deceleration actuator.

The command value sent here as a signal, is not or does not always need to be the longitudinal acceleration value itself. Instead, the signal needs only to achieve the longitudinal acceleration command value via the acceleration/deceleration actuator.

For example, if the acceleration/deceleration actuator is a hydraulic friction brake mechanism that uses a hydraulic fluid pressure to press a brake pad against a brake disc, a hydraulic command value for achieving the longitudinal acceleration command value is sent to a hydraulic friction brake controller. Otherwise, a driving signal for a hydraulic friction brake driving actuator, created to achieve the longitudinal acceleration command value, may be sent directly to the hydraulic friction brake driving actuator, not via the hydraulic friction brake controller.

In addition, the kind of acceleration/deceleration actuator used to control driving according to the longitudinal acceleration command value to be achieved may be changed.

For example, in order to achieve the longitudinal acceleration command value during the slowdown of the vehicle at a long distance in front of the curve, a command value for changing the gear ratio of the transmission may be sent to a transmission controller, and in order to achieve the longitudinal acceleration command value during the slowdown in the vicinity of the curve, the hydraulic command value may be sent to the hydraulic friction brake controller.

The following describes a method of creating the longitudinal acceleration command value in a case that the curve shape acquisition means 2 uses map information on the course which the vehicle travels, and the vehicle position acquisition means 3 uses a GPS.

Figure 7:
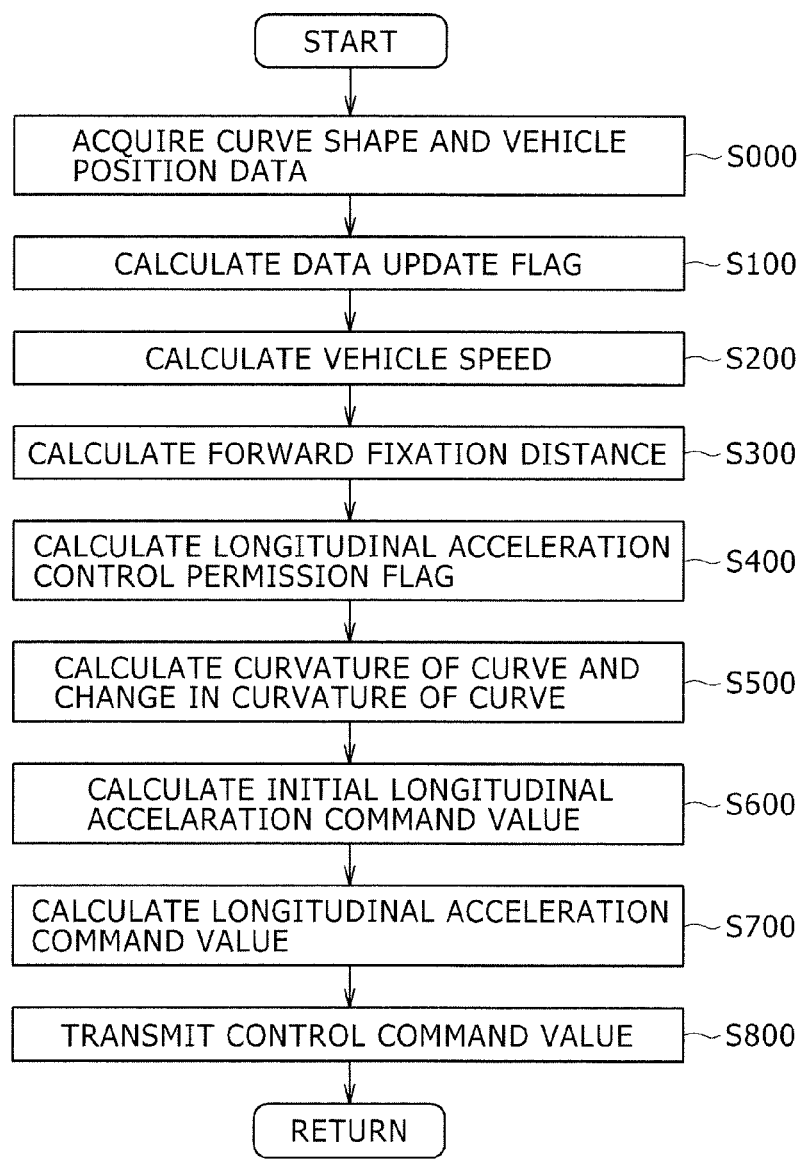
FIG. 7 is a flowchart of the vehicle motion control device shown in FIG. 6.

A flowchart of the computation process in the vehicle motion control device 1 is shown in FIG. 7.

Figure 8:
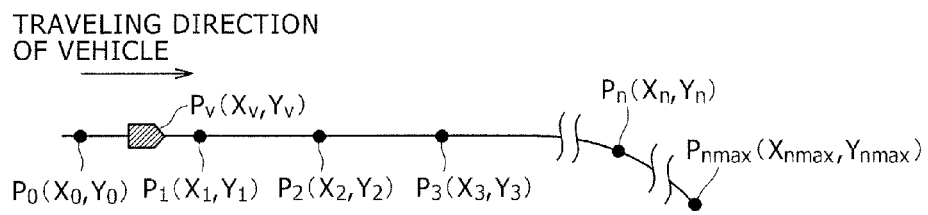
FIG. 8 is a conceptual diagram that shows positions of a vehicle equipped with the vehicle motion control device of FIG. 6, and positions of node points.

In step S000, GPS-based vehicle position data $P_v(X_v, Y_v)$, and node point position data $P_n(X_n, Y_n)$ that denotes positions of node points present in the traveling direction of the vehicle, as curve shape data from position information on the vehicle and from map information, are acquired and computed. Referring to the node point position data, "n" is an integer that as shown in FIG. 8, increases to 1, 2, etc. up to nmax in the traveling direction of the vehicle, with 0 taken as the position of a first node point in a direction opposite to that in which the vehicle is traveling, and nmax is a maximum acquirable value of node point position number "n". The process advances to step S100 after the computation.

In step S100, whether the vehicle position data $P_v(X_v, Y_v)$ has been updated is determined and if the data has been updated, 1 is set up in a data update flag $F_{GPSref}$. Or if the data has not been updated, 0 is set up in the flag. The process advances to step S200 after the setup of 1 or 0. The determination of whether the data has been updated may be by comparing the vehicle position data $P_v(X_v, Y_v)$ with its immediately previous setting of $P_{v\_z1}(X_{v\_z1}, Y_{v\_z1})$ or by acquiring the update flag, in addition to the vehicle position data, from the GPS.

In step S200, the vehicle speed is calculated from a change in vehicle position with time. At this time, if the setting of the data update flag is 0, an immediately previous vehicle speed calculation result is a current speed of the vehicle. If the setting of the data update flag is 1, the vehicle speed V that is the moving speed of the vehicle is calculated from both of a time $\Delta t_p$ required from a time at which 1 was assigned to the data update flag last time, to a time at which 1 has been assigned to the data update flag this time, and a distance $\Delta L_v$ through which the vehicle has moved. The distance $\Delta L_v$ is calculated from both of the vehicle position data $P_{v\_Pz1}(X_{v\_Pz1}, Y_{v\_Pz1})$ existing when the presetting of the data update flag was 1, and the vehicle position data $P_v(X_v, Y_v)$ depending on the current setting of the data update flag.

Figure 9:
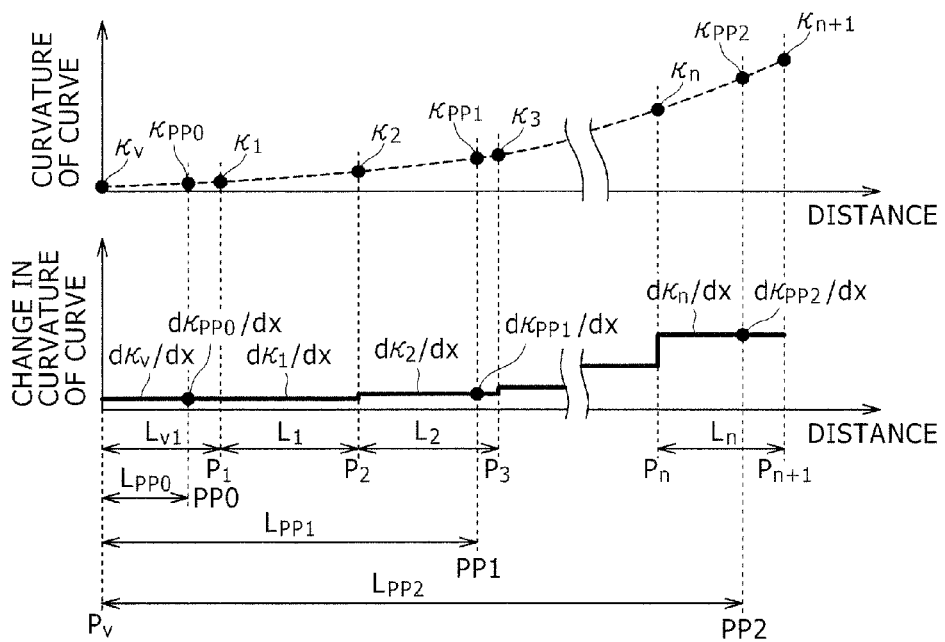
FIG. 9 is a diagram that represents a relationship between a distance, a curvature of the curve, and changes in the curvature of the curve, in the vehicle motion control device of FIG. 6.

In step S300, distances to forward fixation points are computed. As shown in FIG. 9, three forward fixation points, PP0, PP1, PP2, from the immediate vicinity of the vehicle to a position far ahead thereof, are set on the course in the traveling direction of the vehicle, and forward fixation distances $L_{PP0}$, $L_{PP1}$, $L_{PP2}$, from the vehicle to the forward fixation points PP0, PP1, PP2 are calculated.

In this case, even if values of $L_{PP0}$, $L_{PP1}$, $L_{PP2}$ are set beforehand to satisfy a relationship shown in expression (8) below, forward fixation time values $T_{PP0}$, $T_{PP1}$, $T_{PP2}$ that are set beforehand to satisfy $T_{PP0} < T_{PP1} < T_{PP2}$, and the vehicle speed V may be used to assign each of those distance values so that a relationship shown in expression (9) will hold. These expressions, however, assume that the forward fixation point PP0 is present in the immediate vicinity of the vehicle and that a maximum distance $L_{max}$ is a value obtained by totaling the distance from the vehicle position to the node point position $P_1$, and internode point distances from the node point position $P_1$ to a maximum node point position $P_{nmax}$. The process advances to step S400 after the computations.

[Expression 8]

$$L_{PP0} < L_{PP1} < L_{PP2} \leq L_{max} \tag{8}$$

[Expression 9]

$$L_{PPm} = T_{PPm} \cdot V \text{(where ``}m\text{''}=0,1,2) \tag{9}$$

In step S400, computation relating to a longitudinal acceleration control permission flag takes place. If the longitudinal acceleration control permission flag has a value of 1, this indicates that longitudinal acceleration control is permitted, and if the flag has a value of 0, this indicates that longitudinal acceleration control is prohibited. The longitudinal acceleration control permission flag is created as follows: for example, if a time during which 0 remains set up in the data update flag $F_{GPSref}$ exceeds a predetermined value, the longitudinal acceleration control permission flag is set to be 0 since GPS-based vehicle position acquisition is regarded as difficult.

If an actual traveling path based on the vehicle position data significantly departs from the shape of the course on map data that assumes that the vehicle is traveling, the longitudinal acceleration control permission flag is also set to be 0 since the traveling course of the vehicle on the map data is regarded as different from the actual course.

In addition, the longitudinal acceleration control permission flag may be set to 0 according to the vehicle speed V. For example, a minimum vehicle speed at which control is to be started is set in advance and if the vehicle speed V is lower than the minimum vehicle speed, the longitudinal acceleration control permission flag will be set to 0.

Furthermore, when the control device is equipped with a plurality of curve shape data acquisition means and vehicle position data acquisition means as described above, the longitudinal acceleration control permission flag will be set to 0 if curve shape data and vehicle position data are determined to be difficult to acquire with all of the plurality of acquisition means. For example, during the acquisition of curve shape data and vehicle position data by the imaging means in addition to the GPS, if it is determined that as described above, vehicle position acquisition from the GPS is difficult, and that curve shape data and vehicle position data acquisition by the imaging means is also difficult, then the longitudinal acceleration control permission flag will be set to 0. Under all other conditions, the longitudinal acceleration control permission flag is set to 0. The process advances to step S500 after the computation.

In step S500, the curvatures $K_n$ of the curve at each node point position between the point with the node point position data $P_n(X_n, Y_n)$ and the points with a value of at least 1 of "n", the curvature $K_v$ of the curve at the vehicle position, and the changes in the curvature of the curve between the node points, $dK_n/dx$, are calculated and then the curvatures $K_{PP0}$, $K_{PP1}$, $K_{PP2}$ of the curve at the forward fixation distances $L_{PP0}$, $L_{PP1}$, $L_{PP2}$, and the changes in the curvature of the curve, $dK_{PP0}/dx$, $dK_{PP1}/dx$, $dK_{PP2}/dx$, are calculated. The curvature $K_n$ of the curve at node point position $P_n$ can be calculated by determining the radii of curvature of the curves of arcs passing through three successive node points, $P_{n-1}$, $P_n$, $P_{n+1}$, and taking inverse numbers of each.

If the vehicle position agrees with the node point position $P_1$, the curvature $K_v$ of the curve at the vehicle position becomes a curvature $K_1$. If the vehicle position disagrees, the curvature $K_v$ can be calculated from the node points $P_0$, $P_v$, $P_1$. The curvatures $K_n$ and $K_v$ here take plus values, irrespective of the direction of the curve.

If the radius of curvature of the curve is sufficiently large, the curvature $K_n$ may be defined as 0. The change in the curvature of the curve, $dK_n/dx$, is calculated from the thus-obtained distances between each node point and curvatures $K_n$ at each node point. After internode point linear interpolation, if the distance between the node points $P_n$, $P_{n+1}$ is expressed as $L_n$, the change in the curvature of the curve, $dK_n/dx$, between the node points $P_n$, $P_{n+1}$, is given as follows by expression (10):

[Expression 10]

$$\frac{dK_n}{dx} = \frac{(K_{n+1} - K_n)}{L_n} \tag{10}$$

Likewise, if the distance between the vehicle position $P_v$ and the node point $P_1$ is expressed as $L_{v1}$, the change in the curvature of the curve, $dK_v/dx$, between the vehicle position $P_v$ and the node point $P_1$, is given as follows by expression (11):

[Expression 11]

$$\frac{dK_V}{dx} = \frac{(K_1 - K_V)}{L_{V1}} \quad (L_{v1} > 0) \tag{11}$$
$$\frac{dK_V}{dx} = \frac{dK_1}{dx} \quad (L_{v1} = 0)$$

After the curvatures of the curve, $K_n$, and changes in the curvature of the curve, $dK_n/dx$, at each node point, have been calculated, the curvatures of the curve, $K_{PP0}$, $K_{PP1}$, $K_{PP2}$, and changes in the curvature of the curve, $dK_{PP0}/dx$, $dK_{PP1}/dx$, $dK_{PP2}/dx$, that correspond to the forward fixation distances $L_{PP0}$, $L_{PP1}$, $L_{PP2}$, are calculated. For example, if as shown in FIG. 9, the forward fixation point PP0 lies between the vehicle position $P_v$ and the node point $P_1$, PP1 between $P_2$ and $P_3$, and PP2 between $P_n$ and $P_{n+1}$, the curvatures of the curve, $K_{PP0}$, $K_{PP1}$, $K_{PP2}$, and changes in the curvature of the curve, $dK_{PP0}/dx$, $dK_{PP1}/dx$, $dK_{PP2}/dx$, are given as follows by expressions (12) to (17):

[Expression 12]

$$K_{PP0} = K_v + \frac{dK_v}{dx} \cdot L_{PP0} \tag{12}$$

[Expression 13]

$$K_{PP1} = K_2 + \frac{dK_2}{dx} \cdot \{L_{PP1} - (L_{v1} + L_1)\} \tag{13}$$

-continued

[Expression 14]

$$\kappa_{PP2} = \kappa_n + \frac{d\kappa_n}{dx} \cdot \left\{ L_{PP2} - \left( L_{v1} + \sum_{j=1}^{n} L_j \right) \right\} \quad (14)$$

[Expression 15]

$$\frac{d\kappa_{PP0}}{dx} = \frac{d\kappa_v}{dx} \quad (15)$$

[Expression 16]

$$\frac{d\kappa_{PP1}}{dx} = \frac{d\kappa_2}{dx} \quad (16)$$

[Expression 17]

$$\frac{d\kappa_{PP2}}{dx} = \frac{d\kappa_n}{dx} \quad (17)$$

Referring to these expressions, methods of calculating the curvatures of the curve, $K_n$, and changes in the curvature of the curve, $dK_n/dx$, at each node point, are not limited to the above and may be those which enable the calculation of the curvatures of the curve as well as changes in the curvature of the curve at each node point. The process advances to step S600 after the computations.

In step S600, initial longitudinal acceleration command values are created from the vehicle speed V in addition to the curvatures of the curve, $K_{PP0}$, $K_{PP1}$, $K_{PP2}$, and changes in the curvature of the curve, $dK_{PP0}/dx$, $dK_{PP1}/dx$, $dK_{PP2}/dx$, at the forward fixation distances $L_{PP0}$, $L_{PP1}$, $L_{PP2}$. The longitudinal acceleration command values $G_{xREQiniPP0}$, $G_{xREQiniPP1}$ based on the curvatures of the curve, $dK_{PP0}/dx$, $dK_{PP1}/dx$, in the vicinity of the vehicle, are calculated using expression (6), and the longitudinal acceleration command value $G_{xREQiniPP2}$ based on the curvature of the curve, $K_{PP2}$, far ahead of the vehicle, is created using the method shown in FIG. 3.

If the forward fixation distances $L_{PP0}$, $L_{PP1}$, $L_{PP2}$ here are created using the forward fixation time values $T_{PP0}$, $T_{PP1}$, $T_{PP2}$ shown in expression (9), the moving speeds $V_{PP0}$, $V_{PP1}$, $V_{PP2}$ of the forward fixation points PP0, PP1, PP2 are given by following expression (18) using the vehicle longitudinal acceleration $G_x$ obtained by differentiating the vehicle speed V.

In a configuration with the means for acquiring longitudinal acceleration by communicating with an external controller or by conducting a direct measurement with the acceleration sensor, the vehicle longitudinal acceleration $G_x$ may be created from the longitudinal acceleration obtained by that acquisition means.

[Expression 18]

$$V_{PPm} = V + T_{PPm} \cdot G_x \text{ (where } "m"=0,1,2) \quad (18)$$

From expressions (6), (18), the longitudinal acceleration command values $G_{xREQiniPP0}$, $G_{xREQiniPP1}$ are computed using expression (19). Further, $G_{xREQiniPP2}$ is computed from FIG. 3

[Expression 19]

$$G_{xREQiniPPm} = -C_{xym} \cdot \frac{dK_{PPm}}{dx} \cdot V_{PPm} \cdot V^2 \quad (19)$$

(where $"m" = 0, 1$)

where $C_{xy0}$, $C_{xy1}$ can each be a constant that is set beforehand, or a value that is changed according to other conditions. For example, $C_{xy0}$, $C_{xy1}$ can be values that differ between a case of $dK_{PPm}/dx$ being plus and a case of $dK_{PPm}/dx$ being minus. Further alternatively, if other information such as road surface friction coefficients or the driver's accelerator pedal operations is useable, the above values may each be changed using the information. For a low road-surface friction coefficient such as that of a compacted snow road or equivalent, $C_{xy0}$, $C_{xy1}$ are set to be smaller values than for a high road-surface friction coefficient such as that of an asphalt road or equivalent.

In a further example, where the driver is performing accelerator pedal operations, the values that make $dK_{PPm}/dx$ plus are reduced according to a particular operating stroke of the accelerator pedal. The configuration that exploits information other than curve shape information and vehicle position information will be described in a second embodiment. After the above computations, the process advances to step S700.

In step S700, a final longitudinal acceleration command value $G_{xREQfin}$ is created by providing the initial longitudinal acceleration command values $G_{xREQiniPP0}$, $G_{xREQiniPP1}$, $G_{xREQiniPP2}$, with at least one of a process based on intervention threshold values for longitudinal acceleration control, a filtering process, selective processing, additive processing, and the like. For example, filtering with time constants set up according to a sign and increase/decrease direction of each command value $G_{xREQiniPP0}$, $G_{xREQiniPP1}$, $G_{xREQiniPP2}$, is conducted and then appropriate selective processing and/or additive processing for the particular value follows.

Additionally, a longitudinal acceleration control intervention threshold $G_{xBRKs}$ for a decelerating side (braking), and a longitudinal acceleration control intervention threshold $G_{xAccs}$ for an accelerating side are set and these intervention threshold values for longitudinal acceleration control are used for necessary processing. The thresholds $G_{xBRKs}$ and $G_{xAccs}$ are values that are set in advance.

In a region where two of $G_{xREQiniPP0}$, $G_{xREQiniPP1}$, $G_{xREQiniPP2}$ simultaneously have a value other than 0, if both are of the same sign, a greater absolute value of either is adopted, or if both are of different signs, a value obtained by adding both is adopted. In a region where $G_{xREQiniPP0}$, $G_{xREQiniPP1}$, $G_{xREQiniPP2}$ all simultaneously have a value other than 0, absolute values of two of the same sign, of the three, are compared and a value obtained by adding the greater of the two absolute values and the value of the remaining one having a different sign, is adopted. This reduces the negative acceleration developed in a case that $G_{xREQiniPP0}$ is plus and $G_{xREQiniPP2}$ is minus, that is, when there is a curve that generates a minus change in the curvature of the curve at the immediate vicinity of the vehicle and generates a plus change in the curvature of the curve at a position ahead of the vehicle. A feeling of the slowdown during traveling a continuous curve improves as a result.

During the above additions, weighting according to the sign may take place. For example, to assign priority to deceleration, a coefficient that reduces a plus value may be integrated for addition. Conversely, to assign priority to acceleration, a coefficient that increases a minus value may be integrated for addition.

Figure 10:
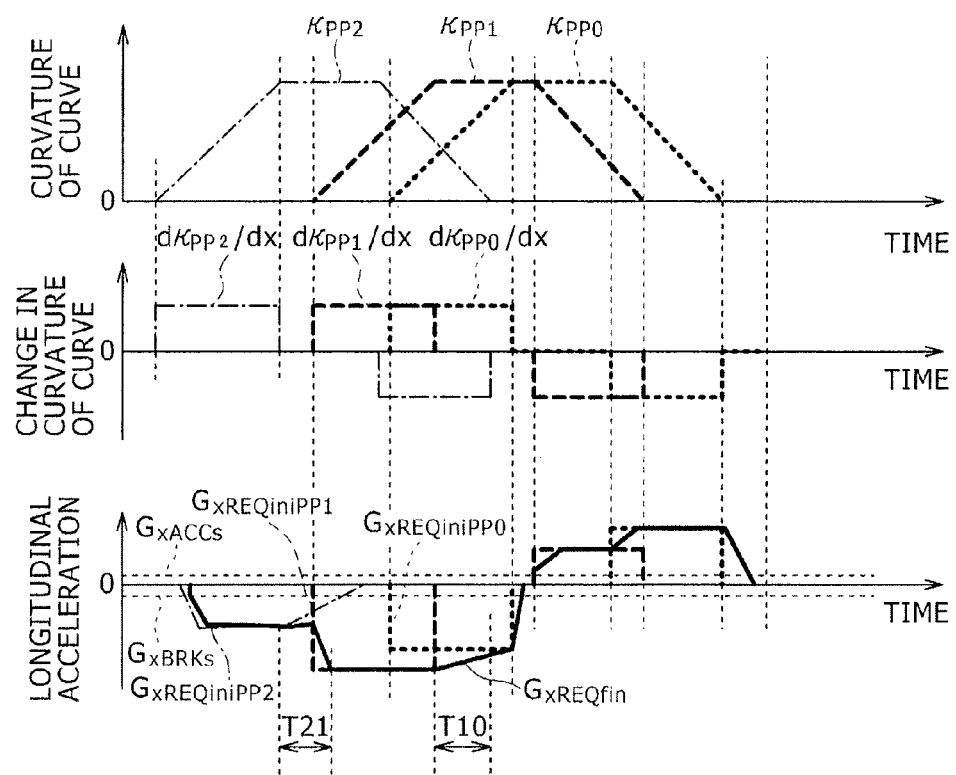
FIG. 10 is a diagram that shows the curvature of the curve, changes in the curvature of the curve, and changes in longitudinal acceleration with time, in the vehicle motion control device of FIG. 6.

Thus, if the vehicle travels a curve that generates those curvatures of the curve, $K_{PP0}$, $K_{PP1}$, $K_{PP2}$, and changes in the curvature of the curve, $dK_{PP0}/dx$, $dK_{PP1}/dx$, $dK_{PP2}/dx$, that are shown in FIG. 10, and $G_{xREQiniPP0}$ shown with a dotted line, $G_{xREQiniPP1}$ shown with a dashed line, and $G_{xREQiniPP2}$ shown with a single-dotted line are obtained, then such a longitudinal acceleration command value $G_{xREQfin}$ as shown with a solid line is obtained. A method of creating $G_{xREQfin}$ from $G_{xREQiniPP0}$, $G_{xREQiniPP1}$, $G_{xREQiniPP2}$ in that case is not limited to or by the above description. However, in a zone that as denoted by T21 in FIG. 10, there is a change from $G_{xREQiniPP2}$ to $G_{xREQiniPP1}$ due to negative longitudinal acceleration, that is, deceleration, the negative acceleration is prevented from decreasing too much.

Similarly, in a zone that as denoted by T10 in FIG. 10, there is a change from $G_{xREQiniPP1}$ to $G_{xREQiniPP0}$ due to negative longitudinal acceleration, that is, deceleration, the negative acceleration is prevented from decreasing too much. After the computation, the process advances to step S800.

In step S800, if the setting of the longitudinal acceleration control permission flag is 1, the command value for obtaining the longitudinal acceleration command value $G_{xREQfin}$, or if the setting of the longitudinal acceleration control permission flag is 0, the command value for prohibiting longitudinal acceleration control is transmitted to the longitudinal acceleration generating means 5.

The signal transmitted when the setting of the longitudinal acceleration control permission flag is 1 is the longitudinal acceleration command value $G_{xREQfin}$, which is transmitted as a control command value in the case that as described above, the transmission of the longitudinal acceleration command value $G_{xREQfin}$ allows the longitudinal acceleration generating means 5 to achieve $G_{xREQfin}$.

If it is necessary to make the command value match the kind of longitudinal acceleration generating means 5, the control command value for the longitudinal acceleration generating means 5, based on the longitudinal acceleration command value $G_{xREQfin}$, is created and transmitted. For example, if the longitudinal acceleration generating means is the hydraulic friction brake mechanism and this brake mechanism controls the longitudinal acceleration by transmitting a hydraulic command value to the hydraulic friction brake controller, the hydraulic command value based on the longitudinal acceleration command value $G_{xREQfin}$ is created and then the created hydraulic command value is transmitted as the control command value.

This makes the vehicle generate a longitudinal acceleration based on the longitudinal acceleration command value $G_{xREQfin}$.

The command for achieving the longitudinal acceleration command value may instead be transmitted to more than one longitudinal acceleration generating means 5. For example, if the longitudinal acceleration generating means 5 for achieving the longitudinal acceleration that has been created from $G_{xREQiniPP2}$, a longitudinal acceleration command value obtained a great distance off to the curve, is the transmission, the engine, or both thereof, the hydraulic friction brake mechanism is added as the longitudinal acceleration generating means 5 for achieving the longitudinal acceleration that has been created from the longitudinal acceleration command values $G_{xREQiniPP1}$ and $G_{xREQiniPP0}$ obtained in the vicinity of the curve.

This generates engine braking force to implement relatively constant slowdown in far front of the curve by changing the throttle angle of the engine or the gear ratio of the transmission, and achieves the deceleration whose rate of change is significant in the vicinity of the curve, by activating the hydraulic friction brake mechanism. Accordingly, the control device implements substantially the same slowdown as the driver would, upon visually perceiving a curve of a relatively large curvature in far front of the curve in the traveling direction, deactivate the accelerator pedal for a slowdown by engine braking and then after definitely recognizing a change in the curvature of the curve in the vicinity of the curve, operating a brake pedal for a further slowdown.

As described above, in the present invention, the deceleration caused to the vehicle changes the deceleration pattern from the deceleration in far front of the curve to the deceleration in the vicinity of the curve, and this change in deceleration pattern improves the driver's feeling of slowdown without bringing about a need for the driver to excessively slow down before recognizing details of the curve ahead.

Second Embodiment for Carrying Out the Invention

Hereunder, a configuration and operation of a vehicle motion control device according to a second embodiment of the present invention will be described using FIGS. 11 to 14.

First, the configuration of the vehicle motion control device according to the second embodiment of the present invention is described below using FIG. 11.

Figure 11:
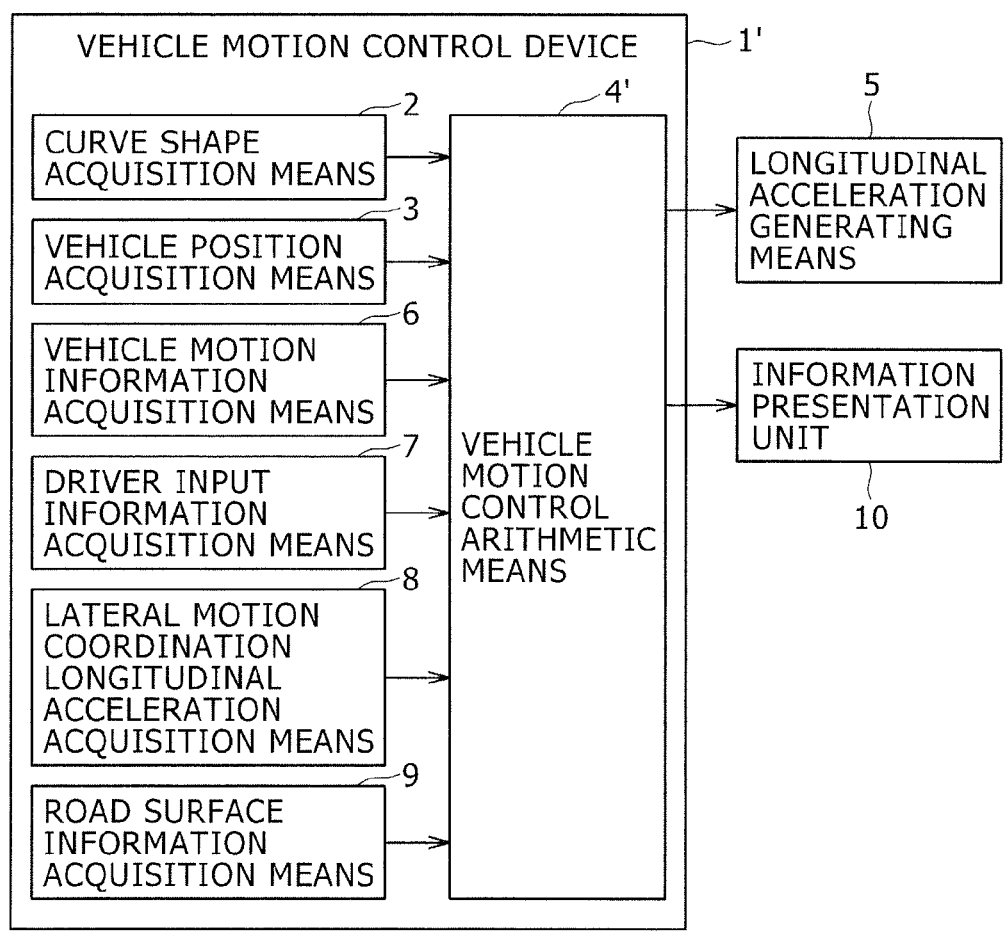
FIG. 11 is a diagram that shows a second embodiment of a vehicle motion control device according to the present invention.

FIG. 11 is a system block diagram showing the configuration of the vehicle motion control device according to the second embodiment of the present invention.

The vehicle motion control device 1' of the present embodiment, intended to be mounted on a vehicle, includes curve shape acquisition means 2 for acquiring a shape of a curve present in front of the vehicle, vehicle position acquisition means 3 for acquiring a position of the vehicle, vehicle motion information acquisition means 6, driver input information acquisition means 7, lateral motion coordination longitudinal acceleration acquisition means 8, road surface information acquisition means 9, and vehicle motion control arithmetic means 4' for computing a longitudinal acceleration to be caused to the vehicle, the computation being based on the information that has been obtained by the curve shape acquisition means 2 and the vehicle position acquisition means 3, and the information that has been obtained by the vehicle motion information acquisition means 6, the driver input information acquisition means 7, the lateral motion coordination longitudinal acceleration acquisition means 8, and the road surface information acquisition means 9.

Computation results by the vehicle motion control arithmetic means 4' are sent to longitudinal acceleration generating means 5 and an information presentation unit 10, and used to present information to a driver as well as to drive an actuator having an ability to cause the longitudinal acceleration to the vehicle.

The curve shape acquisition means 2, vehicle position acquisition means 3 for vehicle information acquisition, and longitudinal acceleration generating means that are included in the above configuration are substantially the same as in the first embodiment, so description of these elements is omitted hereinafter.

The vehicle motion information acquisition means 6 acquires at least a speed V of the vehicle or a longitudinal acceleration $G_x$, or both thereof, as motion information relating to the vehicle. The vehicle speed V and longitudinal acceleration $G_x$ acquired here can be either a value directly detected by a sensor, or computation results obtained from an external electronic controller during communication therewith.

In addition, even if the vehicle speed V and longitudinal acceleration $G_x$ themselves are not input, both can be estimated values. For example, instead of the vehicle speed V, a wheel speed Vw [wheel] for each of four wheels, where [wheel] is filled with characters FL (front left wheel), FR (front right wheel), RL (rear left wheel), or RR (rear right wheel), may be acquired and the vehicle speed V may be estimated from these wheel speeds.

The driver input information acquisition means 7 acquires at least $G_{xDrvREQ}$, a longitudinal acceleration requested from the driver, as input information from the driver. The driver-requested longitudinal acceleration $G_{xDrvREQ}$ acquired here can be either a value directly entered by the driver, or computation results obtained from the external electronic controller during communication therewith. Even if the driver-requested longitudinal acceleration $G_{xDrvREQ}$ itself is not input, this can be an estimated value. For example, instead of the driver-requested longitudinal acceleration $G_{xDrvREQ}$, an accelerator pedal operating stroke and/or a brake pedal operating stroke may be acquired and the driver-requested longitudinal acceleration $G_{xDrvREQ}$ may be estimated from these stroke values. Otherwise, the driver-requested longitudinal acceleration $G_{xDrvREQ}$ less a negative acceleration by engine braking may be estimated only from an actual operating stroke of the accelerator pedal.

In a further example, if the vehicle is driven by the engine, a torque of the engine and a shift position may be acquired and the driver-requested longitudinal acceleration $G_{xDrvREQ}$ may be estimated from the engine torque and the shift position. In a further example, control ON/OFF information and/or a value adjusted or selected as a control quantity by the driver may be acquired in addition to the driver-requested longitudinal acceleration $G_{xDrvREQ}$.

The lateral motion coordination longitudinal acceleration acquisition means 8 acquires a longitudinal acceleration $G_{xGVC}$ based on the lateral jerk of the vehicle, shown in Patent Document 2 or Non-Patent Document 1. In this case, even if the longitudinal acceleration $G_{xGVC}$ itself is not input, $G_{xGVC}$ can be an estimated value. For example, instead of the longitudinal acceleration $G_{xGVC}$, lateral jerk may be acquired and the longitudinal acceleration $G_{xGVC}$ may be correspondingly computed. Alternatively, lateral motion information such as a steering angle, yaw rate, or lateral acceleration, may be acquired and used for computing the longitudinal acceleration $G_{xGVC}$.

The road surface information acquisition means 9 acquires at least a road surface friction coefficient μ and a road surface longitudinal gradient Grad, as road surface information. In this case, even if the road surface friction coefficient μ and the road surface longitudinal gradient Grad themselves are not input, both can be estimated values. For example, instead of the road surface friction coefficient μ, longitudinal acceleration $G_x$, each wheel speed Vw [wheel], and/or the vehicle speed V may be acquired and the road surface friction coefficient μ may be estimated from these values. A self-aligning torque caused by steering may be acquired as another replacement, and the road surface friction coefficient μ may be estimated from this value.

A braking/driving force $F_{wx}$ [wheel] of each wheel or information that replaces $F_{wx}$ [wheel] (e.g., a torque of the engine or a brake pressure) may be acquired as yet another replacement, and the road surface friction coefficient μ may be estimated from these values. Further alternatively, instead of the road surface longitudinal gradient Grad, the braking/driving force $F_{wx}$ [wheel] of each wheel, information that replaces $F_{wx}$ [wheel] (e.g., the engine torque or the brake pressure), and the longitudinal acceleration $G_x$ of the vehicle may be acquired and the road surface longitudinal gradient Grad may be estimated from a difference between a force being caused to the wheel, and an actually developed longitudinal acceleration. In a further example, a value detected by an acceleration sensor mounted to measure a longitudinal acceleration of the vehicle on a flat road may be acquired and the road surface longitudinal gradient Grad may be estimated from a difference between the detected value and a longitudinal acceleration obtained by differentiating the vehicle speed V.

The vehicle motion control arithmetic means 4' is an arithmetic unit with a storage region, arithmetic processing capabilities, and signal input/output means. On the basis of the information obtained by the vehicle motion information acquisition means 6, the driver input information acquisition means 7, the lateral motion coordination longitudinal acceleration acquisition means 8, and the road surface information acquisition means 9, as well as by the curve shape acquisition means 2 and the vehicle position acquisition means 3, the vehicle motion control arithmetic means 4' computes the longitudinal acceleration to be caused to the vehicle, and the information to be presented to the driver, and then sends command values to the longitudinal acceleration generating means 5 and the information presentation means 10. The command value sent here to the longitudinal acceleration generating means 5 is, as in the first embodiment, a command value matching to the kind of acceleration/deceleration actuator to be driven.

The information presentation means 10 is a unit that presents the information which the driver can recognize with at least one of five senses, and the command value sent to the information presentation means 10 is that enabling the information presentation unit to be driven. For example, if the information presentation means 10 is an indicator/display unit, such as an indicator lamp or a display, that gives information to driver's vision, the command value sent to the indicator/display unit is that which activates the indicator lamp or display necessary information on the display, in accordance with the longitudinal acceleration to be caused to the vehicle.

If the information presentation means 10 is a sound generator, such as a beep sound or voice generator, that gives information to driver's auditory sense, the command value, which provides guidance through a beep sound or voice based on the longitudinal acceleration to be caused to the vehicle, is sent to the sound generator.

If the information presentation means 10 is a vibration generator that gives information to driver's tactile sense by generating some form of vibration, as of a steering wheel, a pedal, or a seat, the command value sent to the vibration generator is that which makes it generate the vibration on the basis of the longitudinal acceleration to be caused to the vehicle. The information presentation means 10 may be a combination of the indicator/display unit, the sound generator, and the vibration generator.

The following describes a method of creating a longitudinal acceleration command value by acquiring necessary data and information in a case that the curve shape acquisition means 2 uses map information on a course which the vehicle travels, the vehicle position acquisition means 3 uses a GPS, and the vehicle motion information acquisition means 6, the driver input information acquisition means 7, the lateral motion coordination longitudinal acceleration acquisition means 8, and the road surface information acquisition means 9 each use communication means to communicate with an external electronic controller. The communication means is used to acquire the vehicle speed V, the longitudinal acceleration $G_x$, the driver-requested longitudinal acceleration $G_{xDrvREQ}$, the lateral motion coordination longitudinal acceleration $G_{xGVC}$, the road surface friction coefficient μ, and the road surface longitudinal gradient Grad, by communicating with the external electronic controller, and to acquire longitudinal acceleration control switch ON/OFF information $F_{ctrlsw}$, and a driver-set value $G_{DrvSet}$, by communicating with the external electronic controller or by using input means such as a switch.

Figure 12:
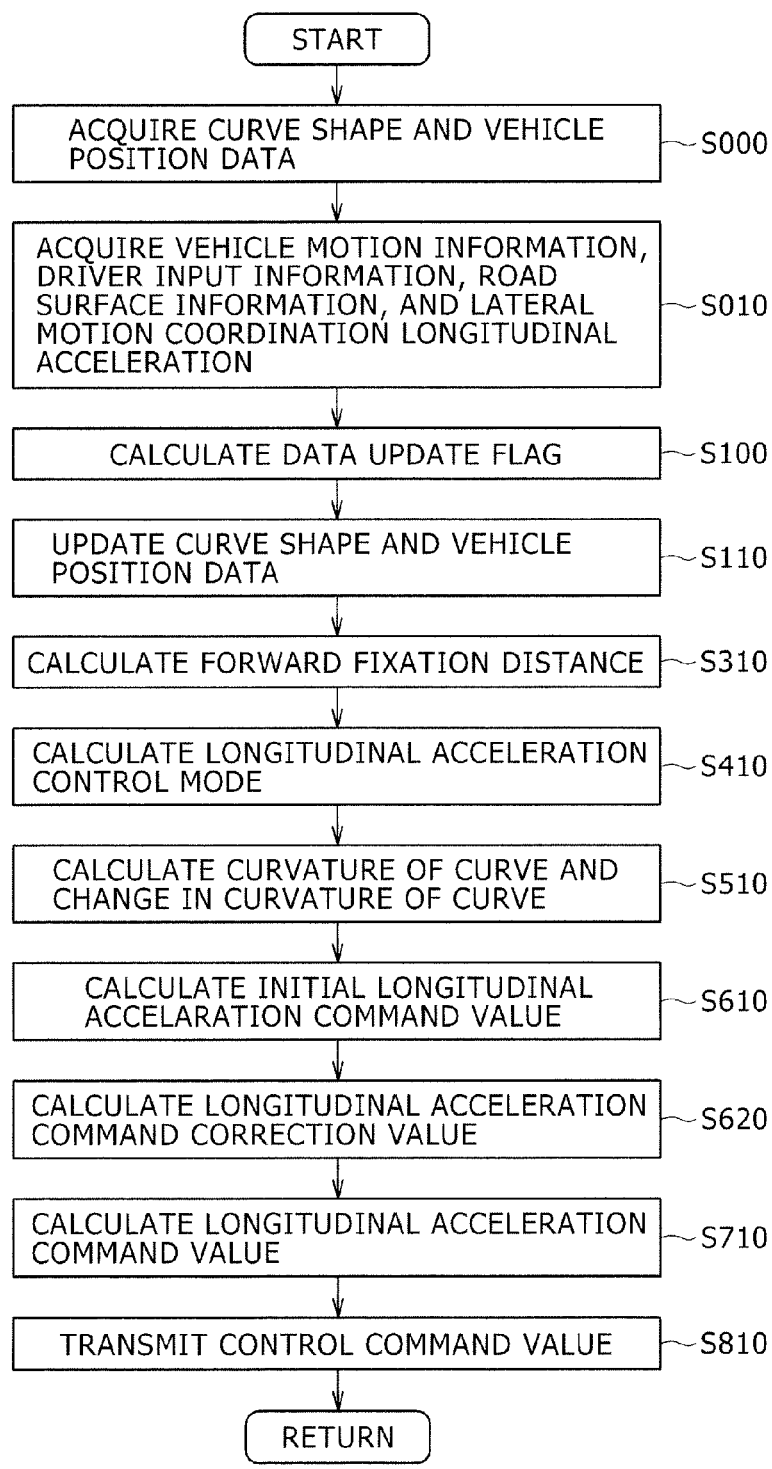
FIG. 12 is a flowchart of the vehicle motion control device shown in FIG. 11.

A flowchart of a computation process in the vehicle motion control device 1' is shown in FIG. 12.

In step S000, as in that of the first embodiment, the shape of the curve and position data relating to the vehicle are acquired and computed. The process advances to step S010 after the computation.

In step S010, the vehicle speed V, the longitudinal acceleration $G_x$, the driver-requested longitudinal acceleration $G_{xDrvREQ}$, the lateral motion coordination longitudinal acceleration $G_{xGVC}$, the road surface friction coefficient μ, and the road surface longitudinal gradient Grad are acquired. The longitudinal acceleration control switch ON/OFF information "$F_{ctrlsw}$" and the driver-set value $G_{DrvSet}$ are also acquired. Alternatively, if as described above, these values are to be obtained by estimation, not direct acquisition, data necessary for the estimation is acquired and computed. The process advances to step S100 after the computation.

In step S100, as in that of the first embodiment, whether the GPS-based vehicle position data $P_v(X_v, Y_v)$ has been updated is determined and if the data has been updated, 1 is set up in a data update flag $F_{GPSref}$, or if the data has not been updated, 0 is set up in the flag. The process advances to step S110 after the setup of 1 or 0.

In step S110, the curve shape and vehicle position data that was obtained in step S000 is updated. If the setting of the data update flag which was operated upon in step S100 is 0, that is, if the GPS-based vehicle position data acquired in step S000 is not updated and only the vehicle motion information and other data acquired in step S010 is not updated, the curve shape and vehicle position data will be updated according to a moving distance of the vehicle that is computed from the curve shape and vehicle position data obtained in step S000 and the vehicle speed V obtained from the vehicle motion information.

For example, if at a time t0, the setting of the data update flag is 1, that is, data is updated using the GPS, the curve shape data obtained at this time will be defined as $P_{t0\_n}(X_{t0\_n}, Y_{t0\_n})$ (where "n" is an integer of 0 or larger, but up to nmax_t0) and the vehicle position data will be defined as $P_{t0\_v}(X_{t0\_v}, Y_{t0\_v})$.

Figure 13:
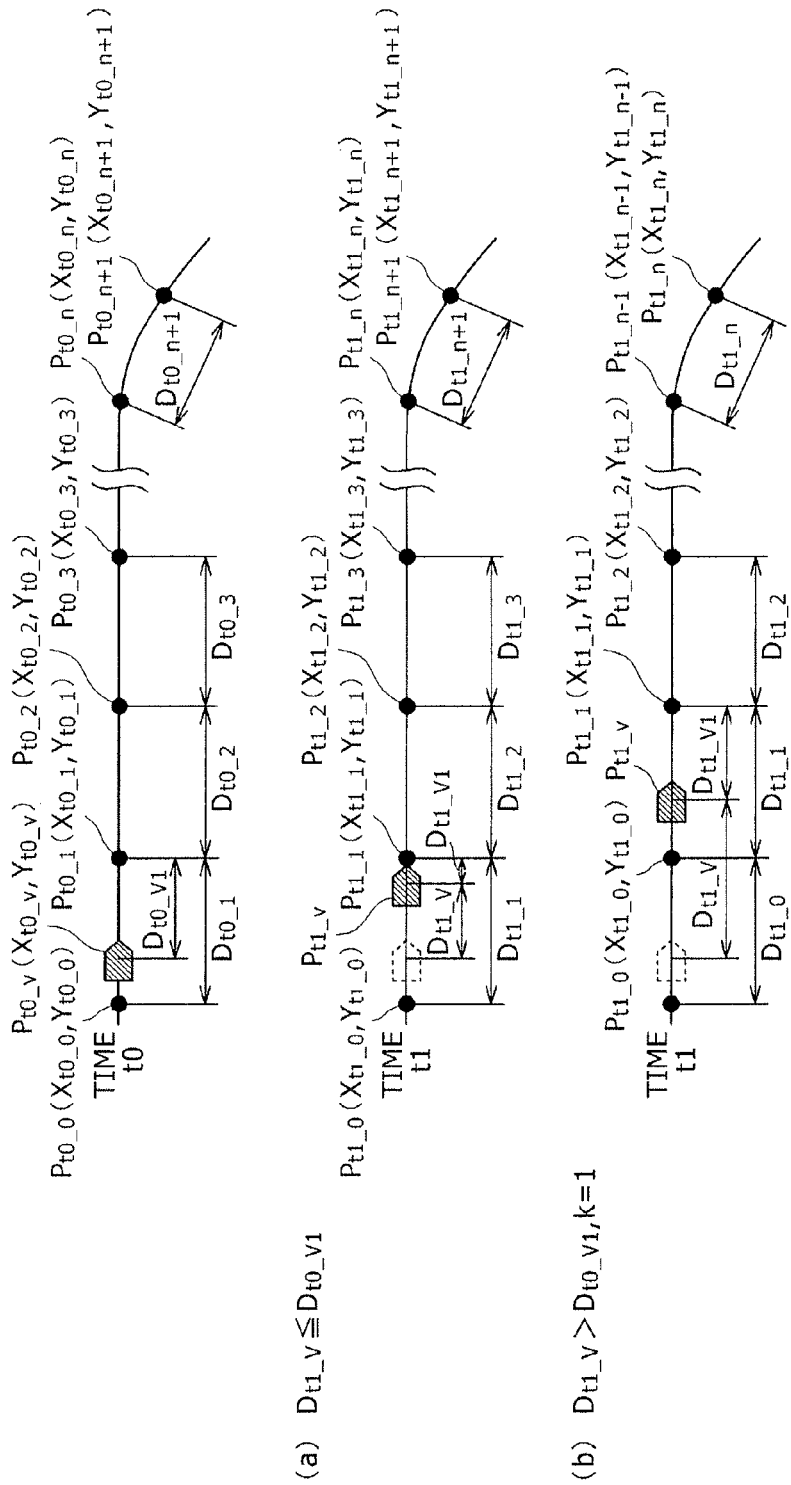
FIG. 13 is a conceptual diagram that shows a relationship between positions of a vehicle equipped with the vehicle motion control device of FIG. 11, and positions of node points.

In addition, as shown in FIG. 13, a distance between node points $P_{t0\_n}$, $P_{t0\_n+1}$ at this time will be defined as $D_{t0\_n+1}$, and a distance between the vehicle position $P_{t0\_v}$ and a node point $P_{t0\_1}$ will be defined as $D_{t0\_v1}$. During computation at time t1, the time after an elapse of $\Delta t_v$ from t0, if the setting of the data update flag at this time is 0, that is, no GPS-based data update operation is conducted and only vehicle motion information and other related data are updated, a moving distance $D_{t1\_v}$ of the vehicle will be calculated from the vehicle speed V and the time $\Delta t_v$, and a relationship in position between the vehicle position and each node point will be correspondingly updated.

In the present invention, as described above, a first node point in a direction opposite to a traveling direction of the vehicle is set as $P_0$. This means that numbers "n" of each node point change according to a relationship in magnitude between $D_v$ and $D_{t0\_v1}$. If $D_{t1\_v}$ is equal to or less than $D_{t0\_v1}$, then since as shown in FIG. 13(a), the vehicle is still present between the node points $P_{t0\_0}$, $P_{t0\_1}$ at the time t1, each node point at t1, the distance between the node points, a maximum value nmax_t1 of the node point numbers, and $D_{t1\_v1}$ are given as follows by expressions (20) to (23), respectively:

[Expression 20]

$$P_{t1\_n}(X_{t1\_n}, Y_{t1\_n}) = P_{t1\_n}(X_{t0\_n}, Y_{t0\_n}) \text{(where "n" is an integer of 0 or larger, but up to nmax\_t0)} \quad (20)$$

[Expression 21]

$$D_{t1\_n} = D_{t0\_n} \text{(where "n" is an integer of 0 or larger, but up to nmax\_t0)} \quad (21)$$

[Expression 22]

$$n\max\_t1 = n\max\_t0 \quad (22)$$

[Expression 23]

$$D_{t1\_v1} = D_{t0\_v1} - D_{t1\_v} \quad (23)$$

Conversely if $D_{t1\_v}$ is greater than $D_{t0\_v1}$, then since the vehicle is present ahead of the node point $P_{t0\_1}$ at the time t1, each node point at t1, the distance between the node points, and $D_{t1\_v1}$ are given as follows by expressions (24) to (27), respectively:

[Expression 24]

$$P_{t1\_n}(X_{t1\_n}, Y_{t1\_n}) = P_{t0\_n+k}(X_{t0\_n+k}, Y_{t0\_n+k}) \text{(where "n" is an integer of 0 or larger, but up to nmax\_t0)} \quad (24)$$

[Expression 25]

$$D_{t1\_n} = D_{t0\_n+k} \text{(where "n" is an integer of 0 or larger, but up to nmax\_t0)} \quad (25)$$

[Expression 26]

$$n\max\_t1 = n\max\_t0 - k \quad (26)$$

[Expression 27]

$$D_{t1\_V1} = D_{t0\_V1} + \sum_{j=2}^{k+1} D_{t0\_Vj} - D_{t1\_V} \quad (1 \leq k \leq n\max\_t0 - 1)$$

$$D_{t1\_V1} = 0 \quad (k = n\max\_t0) \quad (27)$$

where "k" is a minimum integer that makes $D_{t1\_v1}$ in expression (25) equal to or larger than 0 and gives a plus value to nmax_t1.

For example, if the vehicle is present between node points $P_{t0\_1}$, $P_{t0\_2}$ as shown in FIG. 13(b), then "k" is 1. If the curve shape data obtained in step S000 does not include "k" that satisfies the above conditions, nmax_t0 is taken as "k". If the setting of the data update flag is 1, the data at each node point that was obtained in step S000, and the corresponding vehicle position data are taken as current curve shape data and vehicle position data, respectively. The process advances to step S310 after the computations.

In step S310, forward fixation distances are computed. As in the first embodiment, three forward fixation points, PP0, PP1, PP2, from immediate vicinity of the vehicle to far front thereof, are set on the course in the traveling direction of the vehicle, and forward fixation distances $L_{PP0}$, $L_{PP1}$, $L_{PP2}$, from the vehicle to the forward fixation points PP0, PP1, PP2 are calculated.

In this case, even if values of $L_{PP0}$, $L_{PP1}$, $L_{PP2}$ are set beforehand to satisfy the relationship shown in expression (8), forward fixation time values $T_{PP0}$, $T_{PP1}$, $T_{PP2}$ that are set beforehand to satisfy $T_{PP0}<T_{PP1}<T_{PP2}$, and the vehicle speed V may be used to assign each of those distance values so that the relationship shown in expression (9) will hold.

The forward fixation distances $L_{PP0}$, $L_{PP1}$, $L_{PP2}$ may each be changed according to the road surface friction coefficient μ. For example, if the road surface friction coefficient μ is less than a certain value, then $L_{PP0}$, $L_{PP1}$, $L_{PP2}$ may be changed to be longer as the road surface friction coefficient μ decreases. The forward fixation point PP0, however, is set to be that present in the immediate vicinity of the vehicle, and $L_{max}$ is a value obtained by totaling the distance from the vehicle position to the node point position $P_1$, and internode point distances from the node point position $P_1$ to a maximum node point position $P_{nmax}$. The process advances to step S410 after the computations.

In step S410, longitudinal acceleration control mode $G_{xMode}$ is computed. The longitudinal acceleration control mode $G_{xMode}$ is a value that is set such that: if the setting is 0, longitudinal acceleration control does not occur; if the setting is 1, longitudinal acceleration control based on the lateral motion coordination longitudinal acceleration $G_{xGVC}$ is conducted; and if the setting is 2, longitudinal acceleration control based on curve shape data as well as on the lateral motion coordination longitudinal acceleration $G_{xGVC}$ and vehicle position data is conducted.

A method for creating the longitudinal acceleration control mode $G_{xMode}$ is described below. For example, in longitudinal acceleration control switch ON/OFF information $F_{ctrlsw}$, if 0 is set up in $F_{ctrlsw}$ with the longitudinal acceleration control switch set to OFF and 1 is set up in $F_{ctrlsw}$ with the longitudinal acceleration control switch set to ON, then when $F_{ctrlsw}$ is 0, the setting of the longitudinal acceleration control mode $G_{xMode}$ is also 0.

Irrespective of the above, the setting of the longitudinal acceleration control mode $G_{xMode}$ may also be 0, depending on the vehicle speed V.

For example, a minimum vehicle speed at which control is to be started is set beforehand and if the vehicle speed V is lower than the minimum vehicle speed, the longitudinal acceleration control mode $G_{xMode}$ is set to be 0.

The longitudinal acceleration control mode $G_{xMode}$ is also set to be 0 if the lateral motion coordination longitudinal acceleration $G_{xGVC}$ is difficult to acquire and vehicle position data and curve shape data are also difficult to acquire. When the longitudinal acceleration control mode $G_{xMode}$ is not under the conditions that it becomes 0, the longitudinal acceleration control mode $G_{xMode}$ is set to be 1 or 2, depending on the curve shape data and the vehicle position data.

For example, if the time during which 0 remains set up in the data update flag $F_{GPSref}$ exceeds a predetermined time, the longitudinal acceleration control mode $G_{xMode}$ is set to be 1 since GPS-based vehicle position acquisition is regarded as difficult. The longitudinal acceleration control mode $G_{xMode}$ is also set to be 1, if the $D_{t1\_V1}$ that was computed using expression (27) in step S110 is 0. In addition, if an actual traveling path based on the vehicle position data significantly departs from the shape of the course on map data that assumes that the vehicle is traveling, the longitudinal acceleration control mode $G_{xMode}$ is set to be 1, since the traveling course of the vehicle on the map data is regarded as different from the actual course.

When lateral motion information such as a steering angle, yaw rate, or lateral acceleration, can be acquired in addition to the vehicle speed V as vehicle motion, a traveling path estimated from these values, and the GPS-based vehicle position path are computed and if there is a significant departure between the paths, the longitudinal acceleration control mode $G_{xMode}$ is set to be 1, since accuracy of the GPS is recognized as decreasing. Under all other conditions, the longitudinal acceleration control mode $G_{xMode}$ is set to be 2.

Thus, longitudinal acceleration control based on the lateral motion coordination longitudinal acceleration $G_{xGVC}$ can be executed, even under the situation that GPS-based data acquisition is difficult. The process advances to step S510 after the computations.

In step S510, if the value of the longitudinal acceleration control mode $G_{xMode}$ is 2, the curvature of the curve and a change in the curvature of the curve are computed as in step S500 of the first embodiment, and if the value of the longitudinal acceleration control mode $G_{xMode}$ is other than 2, the curvature of the curve and the change in the curvature of the curve are both recognized as 0. The process advances to step S610 after the computations.

In step S610, initial longitudinal acceleration command values are created from the vehicle speed V in addition to the curvatures of the curve, $K_{PP0}$, $K_{PP1}$, $K_{PP2}$, and changes in the curvature of the curve, $dK_{PP0}/dx$, $dK_{PP1}/dx$, $dK_{PP2}/dx$, at the forward fixation distances $L_{PP0}$, $L_{PP1}$, $L_{PP2}$. The longitudinal acceleration command values $G_{xREQiniPP0}$, $G_{xREQiniPP1}$ based on the changes in the curvature of the curve, $dK_{PP0}/dx$, $dK_{PP1}/dx$, in the vicinity of the vehicle, are calculated using expression (6), and the longitudinal acceleration command value $G_{xREQiniPP2}$ based on the curvature of the curve, $K_{PP2}$, far ahead of the vehicle, is created using expression (7).

If the forward fixation distances $L_{PP0}$, $L_{PP1}$, $L_{PP2}$ here are created using the forward fixation time values $T_{PP0}$, $T_{PP1}$, $T_{PP2}$ shown in expression (9), moving speeds $V_{PP0}$, $V_{PP1}$, $V_{PP2}$ of the forward fixation points PP0, PP1, PP2 are given by expression (18) using the vehicle longitudinal acceleration $G_x$. Additionally, the thus-obtained values are next used to compute $G_{xREQiniPP0}$, $G_{xREQiniPP1}$, in expression (19). Furthermore, $G_{xREQiniPP2}$ is computed from expression (7). Referring to these expressions, $C_{xy0}$, $C_{xy1}$, and $C_x$ are values that change according to the road surface friction coefficient μ and the driver-requested longitudinal acceleration $G_{xDrvREQ}$.

These values are set by, for example, assigning them in expressions (28) and (29), using three factors: the $C_{xy0\_ini}$, $C_{xy1\_ini}$, and $C_{x\_ini}$ values that have been initially set as constants assuming that $dK_{PPm}/dx$ is plus; a correction coefficient kμ depending on the road surface friction coefficient μ; and a correction coefficient $kG_{xDrv}$ depending on the driver-requested longitudinal acceleration $G_{xDrvREQ}$.

[Expressions 28]

$$C_{xym} = k\mu \cdot kG_{xDrv} \cdot C_{xym\_ini} \text{(where "}m\text{"} = 0,1) \quad (28)$$

[Expressions 29]

$$C_x = kG_{xDrv} \cdot C_{x\_ni} \quad (29)$$

In these expressions, kμ and $kG_{xDrv}$ are values of 0 or more, but up to 1, kμ being set so that in a region of small road-surface friction coefficients μ, the value of kμ is smaller than in a region of large coefficients μ, and $kG_{xDrv}$ being set so that when the driver-requested longitudinal acceleration $G_{xDrvREQ}$ is greater than a certain value, $kG_{xDrv}$ decreases according to an increment in $G_{xDrvREQ}$ and finally becomes 0. During the computation of $G_{xREQiniPP2}$, values of both $G_{ySET}$ and $G_{xREQfar\_min}$ in expression (7) change according to the particular road-surface friction coefficient μ. For example, when the road-surface friction coefficient μ is less than a certain value, $G_{ySET}$ and $G_{xREQfar\_min}$ are changed to smaller values.

As described in the first embodiment, if $dK_{PPm}/dx$ is minus, data that differs from a case in which $dK_{PPm}/dx$ is plus may be set. The process advances to step S620 after the computations.

In step S620, a longitudinal acceleration command correction value $G_{xREQhoseiPPm}$ (where "m"=0, 1, 2), obtained by correcting an initial longitudinal acceleration command value by the road surface longitudinal gradient Grad, is created. The longitudinal acceleration command correction value is given by expression (30) using the longitudinal acceleration $G_{xGrad}$ caused to the vehicle according to the road surface longitudinal gradient Grad.

[Expressions 30]

$$G_{xREQhoseiPPm} = G_{xREQiniPPm} - G_{xGrad} (G_{xREQiniPPm} \neq 0)$$
(where "m"=0,1)

$$G_{xREQhoseiPPm} = 0 (G_{xREQiniPPm} = 0)(\text{where } "m"=0,1) \quad (30)$$

Here, $G_{xGrad}$ is a value that becomes minus for an upslope and plus for a downslope. The process advances to step S710 after the computations.

Figure 14:
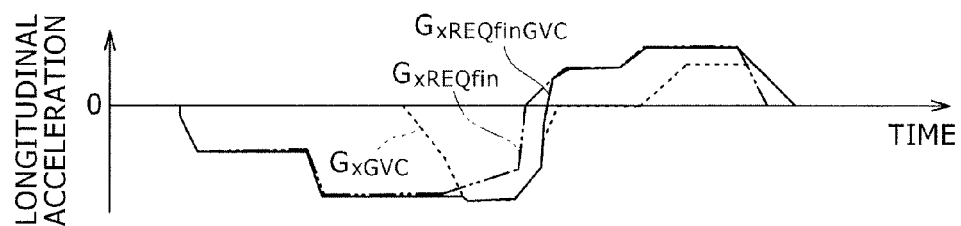
FIG. 14 is a diagram that shows changes in longitudinal acceleration with time, in the vehicle motion control device of FIG. 11.

In step S710, a final longitudinal acceleration command value $G_{xREQfinGVC}$ is created by providing the longitudinal acceleration command correction values $G_{xREQhoseiPP0}$, $G_{xREQhoseiPP1}$, $G_{xREQhoseiPP2}$, with at least one of a process based on intervention threshold values for longitudinal acceleration control, a filtering process, selective processing, additive processing, and the like, and then further combining the thus-obtained longitudinal acceleration command value $G_{xREQfin}$ with the lateral motion coordination longitudinal acceleration $G_{xGVC}$. The computation of $G_{xREQfin}$ is conducted by computing $G_{xREQhoseiPP0}$, $G_{xREQhoseiPP1}$, $G_{xREQhoseiPP2}$ in a manner similar to the computation of $G_{xREQiniPP0}$, $G_{xREQiniPP1}$, $G_{xREQiniPP2}$ in step S700 of the first embodiment. A method of combining $G_{xREQfin}$ and $G_{xGVC}$ is by, for example as shown in FIG. 14, if both are of the same sign, adopting the greater of their absolute values as $G_{xREQfinGVC}$. If both are of different signs, a value obtained by adding both values is adopted as $G_{xREQfinGVC}$.

Weighting may be provided during the addition of both values.

The method of computing $G_{xREQfinGVC}$ by firstly computing $G_{xREQfin}$ and then combining $G_{xREQfin}$ and $G_{xGVC}$, has been described, but the creation of $G_{xREQfinGVC}$ is not limited to this method. For example, instead of the longitudinal acceleration command correction value $G_{xREQhoseiPP0}$ which, during the computation of $G_{xREQfin}$, depends on a position of the forward fixation point PP0 in the immediate vicinity of the vehicle, $G_{xREQfin}$ is computed using $G_{xGVC}$, and a value consequently obtained may be used as $G_{xREQfinGVC}$. The process advances to step S810 after the computations.

In step S810, if the longitudinal acceleration control mode is 1 or 2, the command value for obtaining the longitudinal acceleration command value $G_{xREQfinGVC}$, or if the longitudinal acceleration control mode is 0, the command value for prohibiting longitudinal acceleration control is transmitted to the longitudinal acceleration generating means 5. At the same time, an information presentation command value appropriate for the longitudinal acceleration control state is transmitted to the information presentation unit 10.

The signal transmitted when the longitudinal acceleration control mode is other than 0 is the longitudinal acceleration command value $G_{xREQfinGVC}$, which is transmitted as a control command value in the case that as described above, the transmission of the longitudinal acceleration command value $G_{xREQfinGVC}$ allows the longitudinal acceleration generating means 5 to achieve $G_{xREQfinGVC}$.

If it is necessary to make the command value match the kind of longitudinal acceleration generating means 5, the control command value for the longitudinal acceleration generating means 5, based on the longitudinal acceleration command value $G_{xREQfinGVC}$, is created and transmitted. For example, if the longitudinal acceleration generating means is the hydraulic friction brake mechanism and this brake mechanism controls the longitudinal acceleration by transmitting a hydraulic command value to the hydraulic friction brake controller, the hydraulic command value based on the longitudinal acceleration command value $G_{xREQfinGVC}$ is created and then the created hydraulic command value is transmitted as the control command value. This makes the vehicle generate a longitudinal acceleration based on the longitudinal acceleration command value $G_{xREQfinGVC}$.

The command for achieving the longitudinal acceleration command value may instead be transmitted to more than one longitudinal acceleration generating means 5. For example, if the longitudinal acceleration generating means 5 for achieving the longitudinal acceleration that has been created from $G_{xREQhoseiPP2}$, a longitudinal acceleration command value obtained a great distance off to the curve, is a transmission, the engine, or both thereof, the hydraulic friction brake mechanism is added as the longitudinal acceleration generating means 5 for achieving the longitudinal acceleration that has been created from the longitudinal acceleration command values $G_{xREQiniPP1}$, $G_{xREQiniPP0}$, and $G_{xGVC}$ obtained in the vicinity of the curve.

This generates engine braking force to implement relatively constant slowdown in far front of the curve by changing a throttle angle of the engine or a gear ratio of the transmission, and achieves the deceleration whose rate of change is significant in the vicinity of the curve, by activating the hydraulic friction brake mechanism. Accordingly the control device implements substantially the same slowdown as the driver would, upon visually perceiving a curve of a relatively large curvature in far front of the curve in the traveling direction, deactivate the accelerator pedal for a slowdown by engine braking and then after definitely recognizing a change in the curvature of the curve in the vicinity of the curve, operating a brake pedal for a further slowdown.

For example, the driving command value for the indicator/display unit or sound generator is transmitted to the information presentation unit 10, to notify to the driver that longitudinal acceleration control is underway. In addition, if the longitudinal acceleration control mode is 1, another driving command value for the indicator/display unit or sound generator is transmitted to notify to the driver that the deceleration in front of the curve does not occur, and a reason for this.

Furthermore, the previous value settings used in the present embodiment (e.g., the forward fixation time values $T_{PP0}$, $T_{PP1}$, $T_{PP2}$ and the lateral acceleration data setting $G_{ySET}$) may each be changed according to the driver-set value $G_{DrvSet}$. For example, the driver-set value $G_{DrvSet}$ may be defined as taking a value ranging between 0 and 10 inclusive, and a definition may also be conducted so that if the driver-set value $G_{DrvSet}$ is 0, longitudinal acceleration control from the front of the curve, depending on a position of a forward fixation point, does not occur and only longitudinal acceleration control depending on the lateral motion coordination longitudinal acceleration $G_{xGVC}$ takes place. Under another definition that the deceleration from the far front of the curve increases with an increase in $G_{DrvSet}$, if $G_{DrvSet}$ is 0, $T_{PP0}$, $T_{PP1}$, $T_{PP2}$ may all be set to be very small values, and as $G_{DrvSet}$ increases, $T_{PP2}$ may be set to be large value and $G_{ySET}$ a small value. Thus the deceleration from the far front of the curve changes, which allows both startup timing of the slowdown in front of the curve and an amount of the slowdown to be changed according to the driver's taste.

As described above, in the present invention, when a deceleration pattern changes from the deceleration of the vehicle in far front of the curve to the deceleration in the vicinity of the curve, the longitudinal acceleration control matching to the driver's feeling of slowdown can be achieved by using vehicle motion information and road surface information.

Third Embodiment for Carrying Out the Invention

Hereunder, a configuration and operation of a vehicle motion control device according to a third embodiment of the present invention will be described using FIGS. 15 and 16.

First, the configuration of the vehicle motion control device according to the third embodiment of the present invention is described below using FIG. 15.

Figure 15:
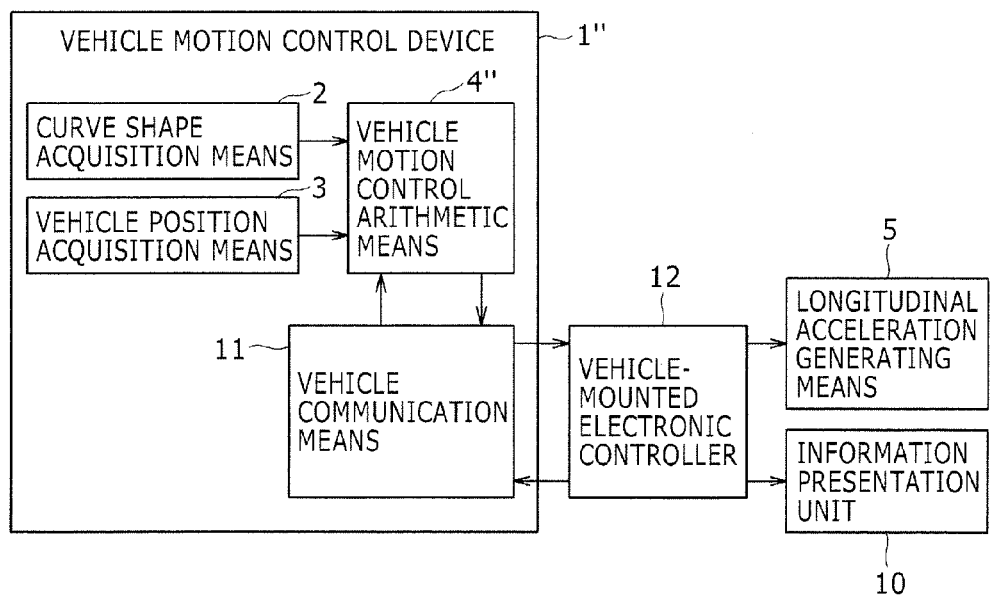
FIG. 15 is a diagram that shows an example of a third embodiment of a vehicle motion control device according to the present invention.

FIG. 15 is a system block diagram showing the configuration of the vehicle motion control device according to the third embodiment of the present invention.

The vehicle motion control device 1" of the present embodiment includes curve shape acquisition means 2 for acquiring a shape of a curve present in front of a vehicle equipped with the control device, vehicle position acquisition means 3 for acquiring a position of the vehicle, vehicle communication means 11 for communicating with an electronic controller 12 mounted on the vehicle, and vehicle motion control arithmetic means 4" for computing a longitudinal acceleration to be caused to the vehicle, the computation being based on the information that has been obtained by the curve shape acquisition means 2, the vehicle position acquisition means 3, and the vehicle communication means 11.

Computation results by the vehicle motion control arithmetic means 4" are sent to longitudinal acceleration generating means 5 and information presentation means 10 via the vehicle-mounted electronic controller 12, and used to drive an actuator having an ability to cause the longitudinal acceleration to the vehicle. The vehicle-mounted electronic controller 12 here is means that communicates with the vehicle motion control device 1", having an ability to drive and control the longitudinal acceleration generating means 5 and the information presentation means 10. In addition, the vehicle-mounted electronic controller 12 may directly control the driving of the acceleration/deceleration actuator which causes the longitudinal acceleration to the vehicle, or may control the driving of the acceleration/deceleration actuator by communicating with the electronic controller that controls the actuator acceleration/deceleration. Similarly, when the vehicle-mounted electronic controller 12 controls the driving of the information presentation means 10, the controller 12 may either conduct direct driving control of the information presentation unit or conduct driving control of this unit by communicating with the electronic controller that controls the unit. Furthermore, the vehicle motion control device 1" of the present embodiment does not necessarily require mounting on the vehicle and may have a shape allowing a driver to readily remove the device from the vehicle.

The curve shape acquisition means 2, vehicle position acquisition means 3 for acquiring the vehicle position, longitudinal acceleration generating means 5, and information presentation means 10 here are substantially the same as those of the first and second embodiments, so that detailed description of these elements is omitted herein.

The vehicle motion control arithmetic means 4" creates a command value for causing the longitudinal acceleration to the vehicle, in accordance with the information obtained by the curve shape acquisition means 2, the vehicle position acquisition means 3, and the vehicle communication means 11, and communicates with the vehicle-mounted electronic controller 12 via the vehicle communication means 11, thereby controlling the longitudinal acceleration of the vehicle. A method of creating the longitudinal acceleration command value in the present embodiment is substantially the same as in the first or second embodiment, so that detailed description of the command-creating method is omitted herein.

The vehicle communication means 11 is means for communicating with the electronic controller 12 mounted on the vehicle. This means of communication may be, for example, either to interconnect the vehicle motion control device 1" and the vehicle-mounted electronic controller 12 via a connector and conduct the communication with the vehicle-mounted electronic controller 12, or to register an identification code for the vehicle motion control device 1", in the vehicle-mounted electronic controller 12 beforehand, and then conduct the communication with the vehicle-mounted electronic controller 12 by wireless communication.

Figure 16:
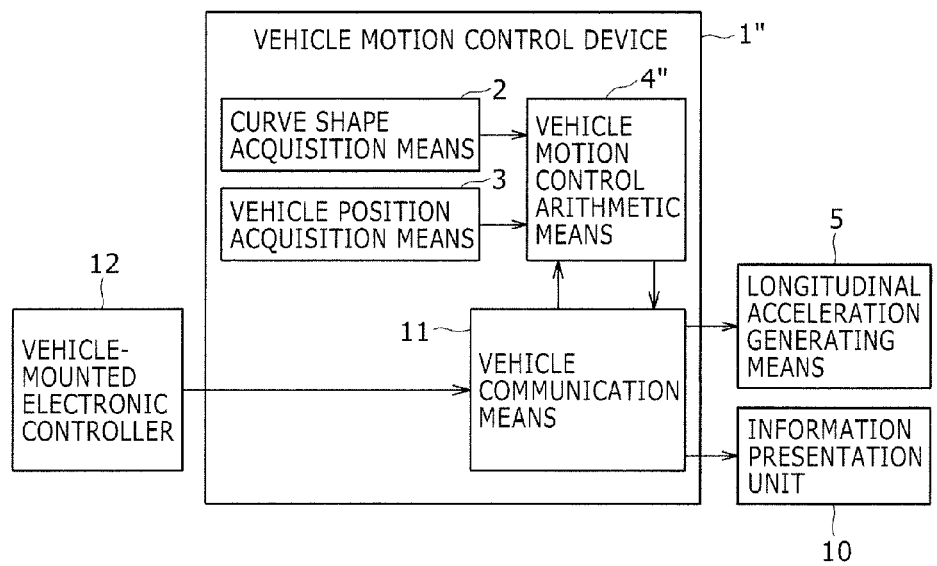
FIG. 16 is a diagram that shows another example of a third embodiment of a vehicle motion control device according to the present invention.

If the longitudinal acceleration generating means 5 and information presentation means 10 here include means to communicate with the vehicle communication means 11, the vehicle motion control device 1" may, as shown in FIG. 16, communicate with the longitudinal acceleration generating means 5 and the information presentation means 10 via the vehicle communication means 11 and conduct driving control of the longitudinal acceleration generating means 5 and the information presentation means 10.

This enables the present invention to be mounted in, for example, a GPS-containing cellular phone or compact hand-held navigation unit or the like, thus enabling the driver to implement the longitudinal acceleration control of the present invention by bringing the cellular phone or compact hand-held navigation unit into the vehicle.

Fourth Embodiment for Carrying Out the Invention

Hereunder, a configuration and operation of a vehicle motion control device according to a fourth embodiment of the present invention will be described using FIG. 17.

First, the configuration of the vehicle motion control device according to the fourth embodiment of the present invention is described below using FIG. 17.

Figure 17:
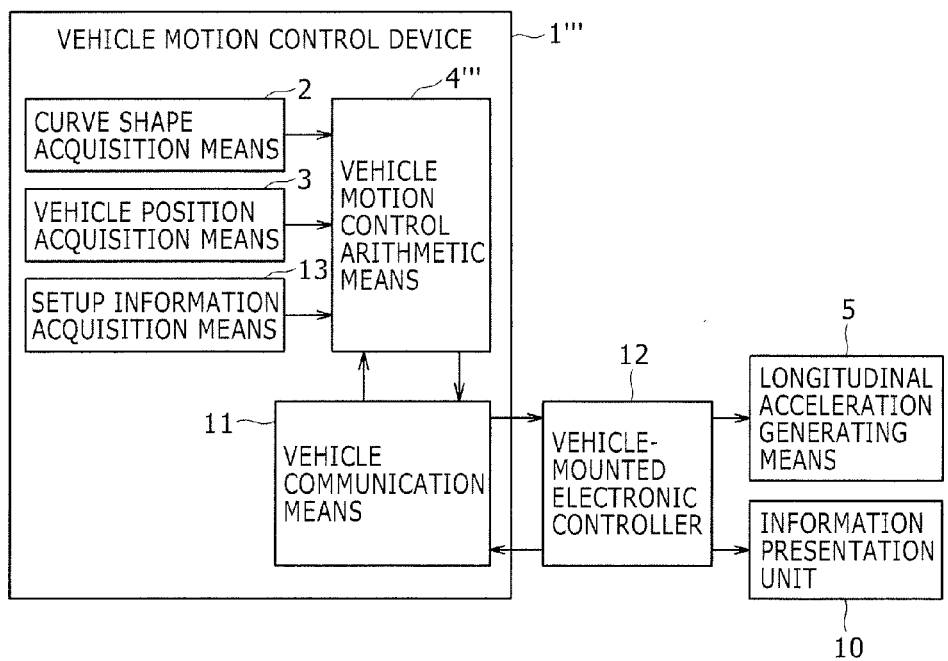
FIG. 17 is a diagram that shows a fourth embodiment of a vehicle motion control device according to the present invention.

FIG. 17 is a system block diagram showing the configuration of the vehicle motion control device according to the fourth embodiment of the present invention.

The vehicle motion control device 1''' of the present embodiment includes curve shape acquisition means 2 for acquiring a shape of a curve present in front of a vehicle, vehicle position acquisition means 3 for acquiring a position of the vehicle, vehicle communication means 11 for communicating with an electronic controller 12 mounted on the vehicle, setup information acquisition means 13, and vehicle motion control arithmetic means 4''' for computing a longitudinal acceleration to be caused to the vehicle, the computation being based on the information that has been obtained by the curve shape acquisition means 2, the vehicle position acquisition means 3, the setup information acquisition means 13, and the vehicle communication means 11.

Computation results by the vehicle motion control arithmetic means 4'' are sent to longitudinal acceleration generating means 5 and information presentation means 10 via the vehicle-mounted electronic controller 12, and used to drive an actuator having an ability to cause the longitudinal acceleration to the vehicle. The vehicle motion control device 1''' of the present embodiment does not necessarily require mounting on the vehicle and may have a shape allowing a driver to readily remove the device from the vehicle.

The curve shape acquisition means 2, vehicle position acquisition means 3 for acquiring the vehicle position, longitudinal acceleration generating means 5, information presentation means 10, vehicle communication means 11, and the vehicle-mounted electronic controller 12 here are substantially the same as those of the first, second, and third embodiments, so that detailed description of these elements is omitted herein.

If a plurality of control modes are available that are determined by prior combination of the forward fixation time values $T_{PP0}$, $T_{PP1}$, $T_{PP2}$, lateral acceleration data settings $G_{ySET}$, and other setup information relating to driver-settable constants, or of several assigned constants, the setup information acquisition means 13 acquires the setup information corresponding to selected one of the control modes. For example, the driver can directly enter the forward fixation time values $T_{PP0}$, $T_{PP1}$, $T_{PP2}$ and lateral acceleration data settings $G_{ySET}$ in certain ranges and these entered values may be adopted as setup information.

Alternatively, control modes, such as a "sport mode" and a "normal mode", that are determined by combination of several constants may be provided and the constants corresponding to one of the control mode that the driver has selected may be adopted as setup information.

The vehicle motion control arithmetic means 4''' includes means for storage of the setup information that the setup information acquisition means 13 has acquired. The vehicle motion control arithmetic means 4''' creates a command value for causing the longitudinal acceleration to the vehicle, in accordance with the information obtained by the curve shape acquisition means 2, the vehicle position acquisition means 3, the setup information acquisition means 13, and the vehicle communication means 11, and communicates with the vehicle-mounted electronic controller 12 via the vehicle communication means 11, thereby controlling the longitudinal acceleration of the vehicle. A method of creating the longitudinal acceleration command value in the present embodiment is substantially the same as in the first and second embodiments, so that detailed description of the command-creating method is omitted herein.

This enables the present invention to be mounted in, for example, a GPS-containing cellular phone or compact handheld navigation unit or the like, thus enabling a plurality of drivers to independently change data settings concerning this cellular phone or compact hand-held navigation unit. Thus, even under a situation that the plurality of drivers share one vehicle, each driver can implement the driver-set longitudinal acceleration control of the present invention by bringing the cellular phone or compact hand-held navigation unit into the vehicle.

Fifth Embodiment for Carrying Out the Invention

Hereunder, a configuration and operation of a vehicle motion control device according to a fifth embodiment of the present invention will be described using FIGS. 18 and 19.

The configuration of the vehicle motion control device according to the fifth embodiment of the present invention is substantially the same as in the first embodiment. The number of forward fixation points used as a reference for computation of a longitudinal acceleration command value, however, differs from that used in the first embodiment.

Figure 18:
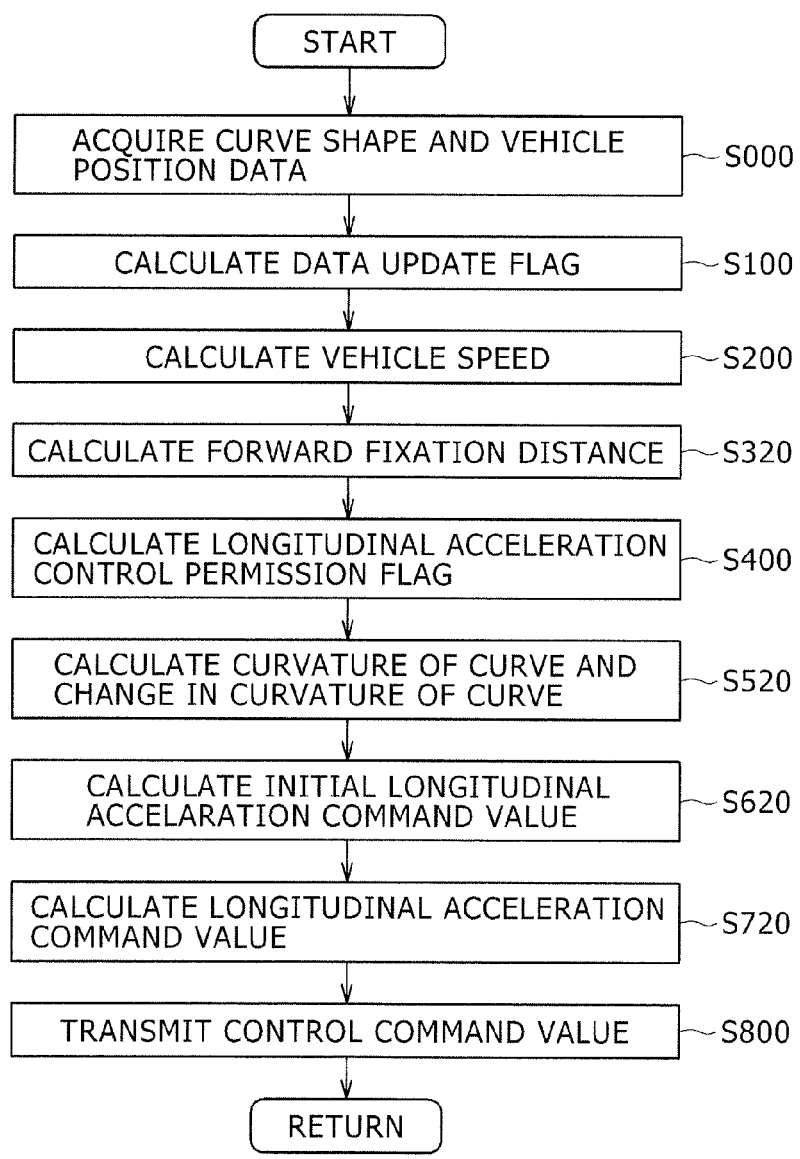
FIG. 18 is a flowchart relating to a fifth embodiment of a vehicle motion control device according to the present invention.
Figure 19:
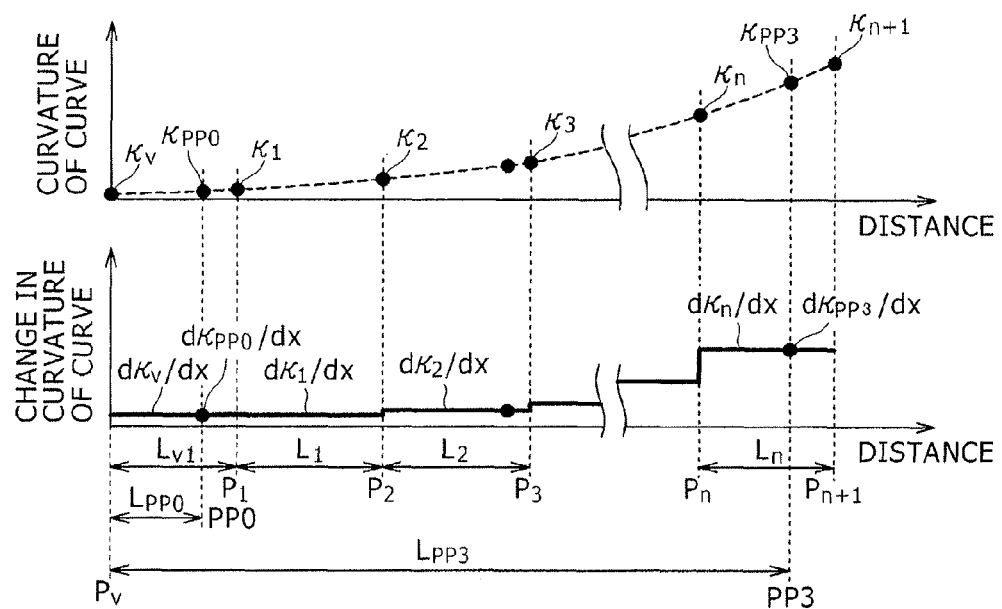
FIG. 19 is a diagram that represents a relationship between a curvature of a curve and changes in the curvature of the curve, in the fifth embodiment of the vehicle motion control device according to the present invention.

A flowchart of the computation process in the vehicle motion control device 1 is shown in FIG. 18.

In step S000, as in that of the first embodiment, curve shape data and vehicle position data are acquired and computed. The process advances to step S100 after the computation.

In step S100, as in that of the first embodiment, whether the vehicle position data $P_v(X_v, Y_v)$ has been updated is determined and if the data has been updated, 1 is set up in a data update flag $F_{GPSref}$, or if the data has not been updated, 0 is set up in the flag. The process advances to step S200 after the setup of 1 or 0.

In step S200, as in that of the first embodiment, the vehicle speed is calculated from a change in vehicle position with time. The process advances to step S320 after the calculation.

In step S320, forward fixation distances are computed. As shown in FIG. 19, two forward fixation points, PP0, PP3, from immediate vicinity of the vehicle to a position far ahead thereof, are set on a course in a traveling direction of the vehicle, and the forward fixation distances $L_{PP0}$, $L_{PP3}$, from the vehicle to the forward fixation points PP0, PP3 are calculated.

In this case, $L_{PP0}$, $L_{PP3}$ are given by expression (31) using forward fixation time values $T_{PP0}$, $T_{PP3}$ (where $T_{PP0}<T_{PP3}$), the vehicle speed V, and moving speeds $V_{PP0}$, $V_{PP3}$ of the forward fixation points, the forward fixation time values $T_{PP0}$, $T_{PP3}$ being set beforehand.

Figure 20:
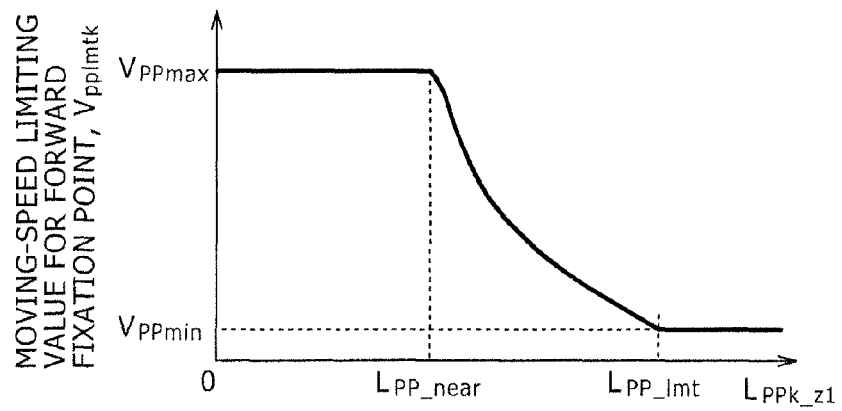
FIG. 20 is a diagram that represents a relationship between a distance to a fifth forward fixation point and a moving speed of the forward fixation point, in the vehicle motion control device according to the present invention.
Figure 21:
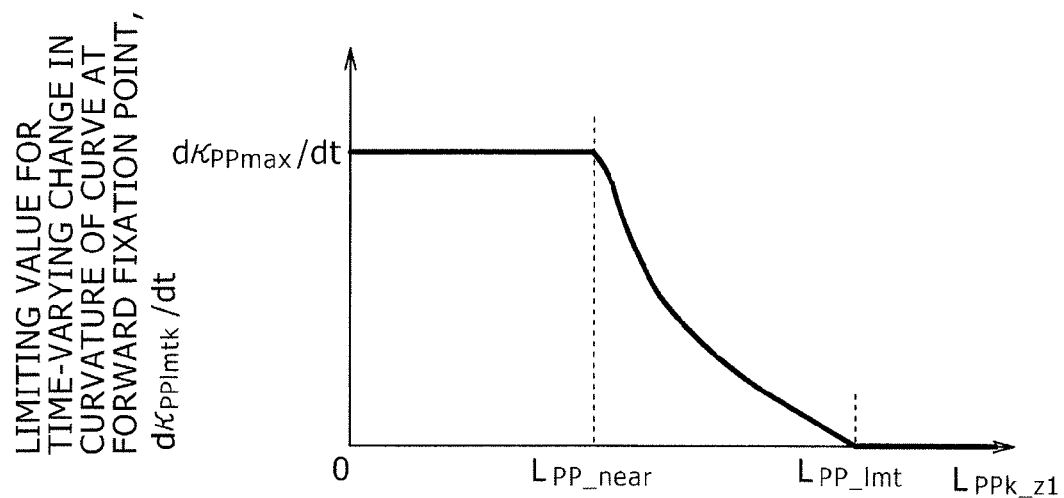
FIG. 21 is a diagram that represents a relationship between the distance to the fifth forward fixation point and a maximum change in a curvature of a curve with time at the forward fixation point, in the vehicle motion control device according to the present invention.

[Expression 31]

$$L_{PPk} = \min(T_{PPk} \cdot V, L_{PPk\_z1} + (V_{PPk} - V) \cdot \Delta t)(K_{PPk\_z1} > 0)$$

$$L_{PPk} = T_{PPk} \cdot V(K_{PPk\_z1} = 0)(\text{where } ``k"=0,3) \qquad (31)$$

where $L_{PP0\_z1}$, $L_{PP3\_z1}$ are immediately previous values of $L_{PP0}$, $L_{PP3}$, respectively, $K_{PP0\_z1}$, $K_{PP3\_z1}$ are immediately previous values of $K_{PP0}$, $K_{PP3}$, $\Delta t$ is a unit step time of computation, and "min (A, B)" is a function that specifies A or B, whichever is the smaller. The moving speeds $V_{PP0}$, $V_{PP3}$ of the forward fixation points are given by expression (32) using both a vehicle longitudinal acceleration $G_x$ obtained by differentiating the vehicle speed V, and moving-speed limiting values $V_{PPlmt0}$, $V_{PPlmt3}$ of the forward fixation points. In this case, if the control device includes means to acquire longitudinal acceleration data by means of either communication with an external controller or direct measurement with an acceleration sensor, the vehicle longitudinal acceleration $G_x$ may be created from the longitudinal acceleration data obtained using such methods. The moving-speed limiting values $V_{PPlmt0}$, $V_{PPlmt3}$ of the forward fixation points are values that are set beforehand according to the immediately previous values $L_{PP0\_z1}$, $L_{PP3\_z1}$ of the forward fixation distances. The moving-speed limiting values $V_{PPlmt0}$, $V_{PPlmt3}$ may be set so that as shown in FIG. 20, if the values $L_{PP0\_z1}$, $L_{PP3\_z1}$ are smaller than $L_{PP\_near}$, then the values $V_{PPlmt0}$, $V_{PPlmt3}$ become equal to $V_{PPmin}$; in a range between a section of $L_{PPmin}$, $L_{PP\_near}$ or more but up to $L_{PP\_lmt}$, the values $V_{PPlmt0}$, $V_{PPlmt3}$ decrease in a form of a downward convex curve as $L_{PP0\_z1}$, $L_{PP3\_z1}$ increase; and if the values $L_{PP0\_z1}$, $L_{PP3\_z1}$ are larger than $L_{PP\_lmt}$, then the values $V_{PPlmt0}$, $V_{PPlmt3}$ become equal to $V_{PPmax}$. Otherwise, time-varying change limiting values $dK_{PPlmt0}/dt$, $dK_{PPlmt3}/dt$ for the curvatures of the curve at the forward fixation points may be set so that as shown in FIG. 21, if the values $L_{PP0\_z1}$, $L_{PP3\_z1}$ are smaller than $L_{PP\_near}$, then the values $dK_{PPlmt0}/dt$, $dK_{PPlmt3}/dt$ become equal to $dK_{PPmax}/dt$; in a range between a section of $L_{PPmax}$, $L_{PP\_near}$ or more but up to $L_{PP\_lmt}$, the values $dK_{PPlmt0}/dt$, $dK_{PPlmt3}/dt$ decrease in a form of a downward convex curve as $L_{PP0\_z1}$, $L_{PP3\_z1}$ increase; and if the values $L_{PP0\_z1}$, $L_{PP\_z1}$ are larger than $L_{PP\_lmt}$, then the values $dK_{PPlmt0}/dt$, $dK_{PPlmt3}/dt$ become equal to 0. In that case, the moving-speed limiting values $V_{PPlmt0}$, $V_{PPlmt3}$ for the forward fixation points may be given by expression (33) using both $dK_{PPlmt0}/dt$, $dK_{PPlmt3}/dt$ and immediately previous values $dK_{PP0\_z1}/dx$, $dK_{PP3\_z1}/dx$ of changes in the curvatures of the curve at the forward fixation points.

[Expression 32]

$$V_{PPk} = \min(V + T_{PPk} \cdot G_x, V_{PPlmtk}) \quad (\kappa_{PPk\_z1} > 0) \tag{32}$$
$$V_{PPk} = V + T_{PPk} \cdot G_x \quad (\kappa_{PPk\_z1} = 0) \text{ (where "}k\text{"} = 0, 3)$$

[Expression 33]

$$V_{PPlmtk} = \frac{d\kappa_{PPlmtk}/dt}{d\kappa_{PPk\_z1}/dx} \quad (d\kappa_{PP0\_z1}/dx \neq 0) \tag{33}$$
$$V_{PPlmtk} = V_{PPmax} \quad (d\kappa_{PP0\_z1}/dx = 0) \text{ (where "}k\text{"} = 0, 3)$$

After the computations, the process advances to step S400.

In step S400, computation relating to a longitudinal acceleration control permission flag takes place similarly to the computation of the longitudinal acceleration control permission flag in the first embodiment. The process advances to step S520 after the computation.

In step S520, the curvatures $K_n$ of the curve at each of node point positions between a point with node point position data $P_n(X_n, Y_n)$ and points with a value of at least 1 of "n", the curvature $K_v$ of the curve at the vehicle position, and the changes in the curvature of the curve between the node points, $dK_n/dx$, are calculated and then the curvatures $K_{PP0}$, $K_{PP3}$ of the curve at the forward fixation distances $L_{PP0}$, $L_{PP3}$, and the changes in the curvature of the curve, $dK_{PP0}/dx$, $dK_{PP3}/dx$, are calculated. The curvature $K_n$ of the curve at node point position $P_n$ can be calculated by determining the radii of curvature of the curves of arcs passing through three successive node points, $P_{n-1}$, $P_n$, $P_{n+1}$, and taking inverse numbers of each.

As in the first embodiment, the curvature $K_n$ of the curve at each node point and the change in the curvature of the curve, $dK_n/dx$, are calculated and after this, the curvatures $K_{PP0}$, $K_{PP3}$ of the curve and changes in the curvature of the curve, $dK_{PP0}/dx$, $dK_{PP3}/dx$, that correspond to the forward fixation distances $L_{PP0}$, $L_{PP3}$ are calculated. For example, if as shown in FIG. 19, PP0 lies between $P_v$ and $P_1$ and PP3 lies between $P_n$ and $P_{n+1}$, the curvatures $K_{PP0}$, $K_{PP3}$ of the curve and the changes in the curvature of the curve, $dK_{PP0}/dx$, $dK_{PP3}/dx$ are given as follows by expressions (34) to (37):

[Expression 34]

$$\kappa_{PP0} = \kappa_v + \frac{d\kappa_v}{dx} \cdot L_{PP0} \tag{34}$$

[Expression 35]

$$\kappa_{PP3} = \kappa_n + \frac{d\kappa_n}{dx} \cdot \left\{ L_{PP3} - \left( L_{v1} + \sum_{j=1}^{n} L_j \right) \right\} \tag{35}$$

[Expression 36]

$$\frac{d\kappa_{PP0}}{dx} = \frac{d\kappa_v}{dx} \tag{36}$$

[Expression 37]

$$\frac{d\kappa_{PP3}}{dx} = \frac{d\kappa_n}{dx} \tag{37}$$

The curvature of the curve, $K_n$, and the change in the curvature of the curve, $dK_n/dx$, in these expressions, are not always calculated using the above methods. These values can instead be calculated using any other methods that allow the calculation of the curvature of the curve at each node point and a change in the curvature of the curve thereat. The process advances to step S620 after the computations.

In step S620, as shown in expression (4), initial longitudinal acceleration command values are created from the vehicle speed V in addition to the curvatures of the curve and changes in the curvature of the curve with time, at the forward fixation distances $L_{PP0}$, $L_{PP3}$. As shown in expression (5), the changes in the curvature of the curve with time, at the forward fixation points, can be expressed using the changes in the curvature of the curve, $dK_{PP}/dx$, at the forward fixation points, and the moving speeds $V_{PP}$ of the forward fixation points, and the initial longitudinal acceleration command values $G_{xREQiniPP0}$, $G_{xREQiniPP3}$ can be computed as follows from expression (38) using expressions (4) to (6) and (31) to (37):

[Expression 38]

$$G_{xREQiniPPm} = -C_{xym} \cdot \frac{d\kappa_{PPm}}{dx} \cdot V_{PPm} \cdot V^2 \tag{38}$$
(where "$m$" = 0, 3)

where $C_{xy0}$, $C_{xy3}$ can each be either a constant that is set beforehand, or a value that is changed according to other conditions. For example, they can be values that differ between a case of $dK_{PPm}/dx$ being plus and a case of $dK_{PPm}/dx$ being minus. Further alternatively, if other information such as road surface friction coefficients or the driver's accelerator pedal operations is useable, the above values may each be changed using the information. For a low road-surface friction coefficient such as that of a compacted snow road or equivalent, $C_{xy0}$, $C_{xy3}$ are set to be smaller values than for a high road-surface friction coefficient such as that of an asphalt road or equivalent.

In a further example, where the driver is performing accelerator pedal operations, the values that make $dK_{PPm}/dx$ plus are reduced according to a particular operating stroke of the accelerator pedal. The configuration that exploits information other than curve shape information and vehicle position information is as described in the second embodiment. After the above computations, the process advances to step S720.

In step S720, a final longitudinal acceleration command value $G_{xREQfin}$ is created by providing the longitudinal acceleration command correction values $G_{xREQiniPP0}$, $G_{xREQiniPP3}$, with at least one of a process based on intervention threshold values for longitudinal acceleration control, a filtering process, selective processing, additive processing, and the like. For example, filtering with time constants set up according to a sign and increase/decrease direction of each command value $G_{xREQiniPP0}$, $G_{xREQiniPP3}$, is conducted and then appropriate selective processing and/ or additive processing for the particular value follows.

Additionally, a longitudinal acceleration control intervention threshold $G_{xBRKs}$ for a decelerating side (braking), and a longitudinal acceleration control intervention threshold $G_{xACCs}$ for an accelerating side are set and these intervention threshold values for longitudinal acceleration control are used for necessary processing. The thresholds $G_{xBRKs}$ and $G_{xAccs}$ are values that are set in advance.

In a region where $G_{xREQiniPP0}$, $G_{xREQiniPP3}$ simultaneously have a value other than 0, if both are of the same sign, a greater absolute value of either is adopted, or if both are of different signs, a value obtained by adding both is adopted. This reduces the negative acceleration developed in a case that $G_{xREQiniPP0}$ is plus and $G_{xREQiniPP3}$ is minus, that is, when there is a curve that generates a minus change in the curvature of the curve at the immediate vicinity of the vehicle and generates a plus change in the curvature of the curve at a position ahead of the vehicle. A feeling of the slowdown during traveling a continuous curve improves as a result.

During the above additions, weighting according to the sign may take place. For example, to assign priority to deceleration, a coefficient that reduces a plus value may be integrated for addition. Conversely, to assign priority to acceleration, a coefficient that decreases a minus value may be integrated for addition.

Figure 22:
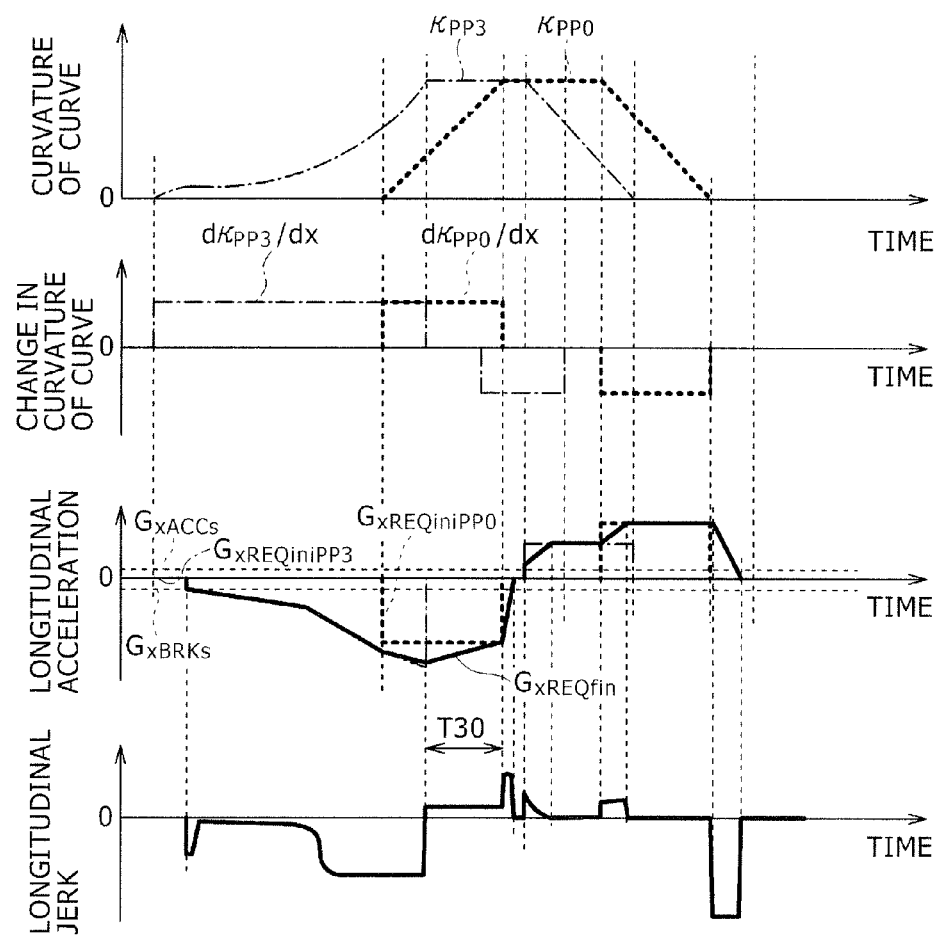
FIG. 22 is a diagram that shows a curvature of a fifth curve, speed, longitudinal acceleration, and changes in the longitudinal acceleration with time, in the vehicle motion control device according to the present invention.

Thus, if the vehicle travels a curve that generates those curvatures of the curve, $K_{PP0}$, $K_{PP3}$, and changes in the curvature of the curve, $dK_{PP0}/dx$, $dK_{PP3}/dx$, that are shown in FIG. 22, and $G_{xREQiniPP0}$ shown with a dotted line and $G_{xREQiniPP3}$ shown with a dashed line are obtained, then such a longitudinal acceleration command value $G_{xREQfin}$ as shown with a solid line is obtained. In addition to the increase/decrease in the longitudinal acceleration at that time during the computation of the first negative longitudinal acceleration command value, another increase/decrease in longitudinal acceleration is occurring during a time from a start of an approach to the curve, until the curvature of the curve reaches a maximum value. A method of creating $G_{xREQfin}$ from $G_{xREQiniPP0}$, $G_{xREQiniPP3}$ in that case is not limited to or by the above description. However, in a zone that as denoted by T30 in FIG. 22, there is a change from $G_{xREQiniPP3}$ to $G_{xREQiniPP0}$ due to negative longitudinal acceleration, that is, deceleration, the negative acceleration is prevented from decreasing too much. After the computation, the process advances to step S800.

In step S800, as in the first embodiment, if the setting of the longitudinal acceleration control permission flag is 1, the command value for obtaining the longitudinal acceleration command value $G_{xREQfin}$ is transmitted to the longitudinal acceleration generating means 5. On the other hand, if the setting of the longitudinal acceleration control permission flag is 0, the command value for prohibiting longitudinal acceleration control is transmitted to the longitudinal acceleration generating means 5.

The signal transmitted when the setting of the longitudinal acceleration control permission flag is 1 is the longitudinal acceleration command value $G_{xREQfin}$, which is transmitted as a control command value in the case that as in the first embodiment, the transmission of the longitudinal acceleration command value $G_{xREQfin}$ allows the longitudinal acceleration generating means 5 to achieve $G_{xREQfin}$.

As described above, if the driver changes the moving speed of the forward fixation point according to the particular distance to the curve, the driver can realize the slowdown that matches the driver's expectations, by increasing negative acceleration in the vicinity of the curve where the driver would begin to recognize time-varying changes in the curvature of the curve in detail. In this case, it is unnecessary for the driver to excessively slow down in far front of the vehicle where the driver is estimated to be unable to recognize the time-varying changes in the curvature of the curve in detail. The driver's feeling of the slowdown improves since the slowdown matching the driver's expectations is implemented. In addition, the fifth embodiment can be implemented in the configuration of any one of the second to fourth embodiments.

DESCRIPTION OF REFERENCE NUMBERS

1 Vehicle motion control device
2 Curve shape acquisition means
3 Vehicle position acquisition means
4 Vehicle motion control arithmetic means
5 Longitudinal acceleration generating means
6 Vehicle motion information acquisition means
7 Driver input information acquisition means
8 Lateral motion coordination longitudinal acceleration acquisition means
9 Road surface information acquisition means
10 Information presentation unit
11 Vehicle communication means
12 Vehicle-mounted electronic controller
13 Setup information acquisition means All the publications, patents, and patent applications that have been herein cited are herein incorporated by reference in their entirety.

The invention claimed is:
1. A vehicular device, comprising:
a vehicle motion controller that acquires a shape of a curve present in front of a current position of a traveling vehicle, the vehicle motion controller also acquiring a position of the traveling vehicle;
a processor that outputs a command on a basis of the shape of the curve and on a basis of the position of the traveling vehicle, wherein
first negative longitudinal jerk during a first time period that takes place before entering the curve, and a second negative longitudinal jerk during a second time period that takes place before the first time period, are generated in response to operation of a driving controller on a basis of the command output by the processor,
the first time period and the second time period are included in a third time period that begins at a time when deceleration begins and that ends at a time at which negative acceleration becomes a maximum,
positive longitudinal jerk is not generated in the third time period,
wherein the vehicle motion controller also:
acquires road surface information relating to road surface along which the vehicle travels, and computes a command value relating to longitudinal acceleration to be caused to the vehicle, the command value being based upon the road surface information, and wherein the processor is also configured to
acquire a forward-fixation-distance,
acquire the command value based on the forward fixation distance,
determine whether a road-surface-friction-coefficient is equal to or less than a predetermined value based on road surface information, wherein
the forward-fixation-distance in a first condition is longer than the forward-fixation-distance in a second condition,
the first condition corresponds to the road-surface-friction-coefficient being equal to or less than the predetermined value, and
the second condition corresponds to the road-surface-friction-coefficient being larger than the predetermined value.

2. The vehicular device according to claim 1, wherein a plurality of different negative longitudinal acceleration command values include a first longitudinal acceleration command value that causes a first negative acceleration to the vehicle in front of the curve and after this, becomes substantially constant, and a second longitudinal acceleration command value that changes so that a negative acceleration caused to the vehicle will change before the vehicle starts approaching the curve; and
the first longitudinal acceleration command value has a maximum absolute value that is different than that of the second longitudinal acceleration command value.

3. The vehicular device according to claim 1, wherein based on a time-varying change in curvature of the curve at either a predefined distance from the vehicle position taken as an origin, or a distance obtained from a product of a speed of the vehicle and a predefined time, the vehicle motion controller generates a decrease in a longitudinal acceleration command value which generates an increase/decrease in longitudinal jerk which is a change in longitudinal acceleration with time.

4. The vehicular device according to claim 1, wherein based on a speed of the vehicle in addition to either a curvature of the curve ahead of the vehicle or a rate of change of the curvature of the curve, the vehicle motion controller generates a decrease in a longitudinal acceleration command value which generates an increase/decrease in a longitudinal jerk which is a change in longitudinal acceleration with time.

5. The vehicular device according to claim 1, wherein the vehicle motion controller:
calculates a speed of a vehicle,
sets a plurality of predefined forward fixation points on a course in a traveling direction of the vehicle, and calculating forward fixation distances each from the position of the vehicle to one of the forward fixation points,
calculates curvatures of the curve at each of the forward fixation distances and time-varying changes in curvature of the curve at each forward fixation point; and
computes a longitudinal acceleration command value based upon the time-varying change in the curvature of the curve at the forward fixation distance as well as upon the curvature of the curve thereat.

6. The vehicular device according to claim 1, wherein the vehicle motion controller also:
acquires at least one set of vehicle motion including a speed of the vehicle and a longitudinal acceleration thereof,
acquires a longitudinal acceleration requested from a driver,
acquires a lateral motion coordination longitudinal acceleration based upon lateral jerk of the vehicle, and
computes the command value relating to the longitudinal acceleration to be caused to the vehicle, the command value being based upon the shape of the curve, the position of vehicle, the vehicle motion, the driver requested longitudinal acceleration, the lateral motion coordination longitudinal acceleration, and the road surface information, and
wherein the road surface information includes road surface friction coefficients, and road surface longitudinal gradients of a road surface along which the vehicle travels.

7. The vehicular device according to claim 6, wherein the vehicle motion controller detects an ON or OFF state of a longitudinal acceleration control switch and outputs ON/OFF information relating to the longitudinal acceleration control switch; and
the vehicle motion controller also
sets a plurality of predefined forward fixation points on a course in a traveling direction of the vehicle, and calculates forward fixation distances each from the position of the vehicle to one of the forward fixation points,
computes data relating to a longitudinal acceleration control mode, based upon the longitudinal acceleration control switch ON/OFF information, the speed of the vehicle, the shape of the curve, the position of the vehicle, and the lateral motion coordination longitudinal acceleration,
calculates, based on the computed longitudinal acceleration control mode, curvatures of the curve at each of the forward fixation distances and time-varying changes in curvature of the curve at each forward fixation point,
computes a longitudinal acceleration command value based upon the time-varying change in the curvature of the curve at the forward fixation distance, the curvature of the curve thereat, and the vehicle speed thereat, and
outputs, based on the computed longitudinal acceleration control mode, a control command value for achieving the computed longitudinal acceleration command value.

8. The vehicular device according to claim 7, wherein when a first forward fixation point speed or a second forward fixation point speed, whichever has a smaller value, is defined as a forward fixation point speed,
the first forward fixation point speed being obtained to a product of a longitudinal acceleration of the vehicle and a predefined forward fixation time,
the second forward fixation point speed being created based on a curvature of the curve at a forward fixation point position and a forward fixation distance, and
the forward fixation point is set based on a distance obtained by integrating the forward fixation point speed, or from a product of the vehicle speed and a predefined forward fixation time.

9. The vehicular device according to claim 1, wherein the vehicle motion controller also:

exchanges information with an electronic controller mounted on the vehicle, the electronic controller being an external device not included in the vehicle motion controller.

10. The vehicular device according to claim 1, wherein the vehicle motion controller acquires the shape of the curve from at least one of map information relating to a course which the vehicle travels, curve information by road-to-vehicle communication system, curve information by vehicle-to-vehicle communication system; and an image.

11. The vehicular device according to claim 1, wherein the vehicle motion controller acquires the position from at least one of data by a global positioning system, data by road-to-vehicle communication system, and image.

12. The vehicular device according to claim 1, wherein the vehicle motion controller also:
acquires at least one set of vehicle motion including a speed of the vehicle and a longitudinal acceleration thereof,
acquires a longitudinal acceleration requested from a driver, and
acquires a lateral motion coordination longitudinal acceleration based upon lateral jerk of the vehicle.

13. The vehicular device according to claim 1, wherein the road surface information includes road surface friction coefficient.

14. The vehicular device according to claim 1, wherein the road surface information includes road surface longitudinal gradient of a road surface along which the vehicle travels.

15. A vehicular device, comprising:
a vehicle motion controller that acquires a shape of a curve present in front of a current position of a traveling vehicle, the vehicle motion controller also acquiring a position of the traveling vehicle;
a processor that outputs a command on a basis of the shape of the curve and on a basis of the position of the traveling vehicle, wherein first negative longitudinal jerk during a first time period that takes place before entering the curve, and a second negative longitudinal jerk during a second time period that takes place before the first time period, are generated in response to operation of a driving controller on a basis of the command output by the processor,
the first time period and the second time period are included in a third time period that begins at a time when deceleration begins and that ends at a time at which negative acceleration becomes a maximum,
positive longitudinal jerk is not generated in the third time period,
wherein the vehicle motion controller also:
acquires road surface information relating to road surface along which the vehicle travels,
computes a command value relating to longitudinal acceleration to be caused to the vehicle, the command value being based upon the road surface information, the position of vehicle, the vehicle motion, the driver requested longitudinal acceleration, the lateral motion coordination longitudinal acceleration, and the road surface information, and
where the command value relating to longitudinal acceleration is calculated using the following expression:

$$-C_{xym} \cdot \frac{dK_{PPm}}{dx} \cdot V_{PPm} \cdot V^2,$$

where $dK_{pp}/dX$ is a rate of change of a curvature of the curve, $C_{xy}$ is a proportionality constant, $V_{pp}$ is a moving speed of a forward fixation point, V is the traveling vehicle speed, and m has a value of either 0, 1, or 2.

* * * * *